United States Patent [19]
Utsumi

[11] Patent Number: 5,966,451
[45] Date of Patent: Oct. 12, 1999

[54] DISTRIBUTED NETWORK COMPUTING SYSTEM, AND DATA EXCHANGE APPARATUS AND METHOD AND STORAGE MEDIUM USED IN THIS SYSTEM

[75] Inventor: Masaki Utsumi, Tokorozawa, Japan

[73] Assignee: Kabushiki Kaisha Toshiba, Kawasaki, Japan

[21] Appl. No.: 08/897,973

[22] Filed: Jul. 21, 1997

[30] Foreign Application Priority Data

| Feb. 20, 1997 | [JP] | Japan | 9-036373 |
| Feb. 25, 1997 | [JP] | Japan | 9-040549 |
| Feb. 27, 1997 | [JP] | Japan | 9-044240 |
| Feb. 27, 1997 | [JP] | Japan | 9-044241 |

[51] Int. Cl.$^6$ .................................................. H04K 3/00
[52] U.S. Cl. ................... 380/49; 380/59; 395/200.31; 395/200.33
[58] Field of Search ........................... 380/9, 10, 20, 380/21, 28, 49, 50, 59; 395/187.01, 200.3, 200.31, 200.32, 200.33, 200.38, 200.39, 200.4, 200.53, 200.6, 200.67, 200.76, 200.78, 200.8; 379/157, 201; 370/259

[56] References Cited

U.S. PATENT DOCUMENTS

| 4,688,170 | 8/1987 | Waite et al. |
| 4,878,166 | 10/1989 | Johnson et al. |
| 5,142,622 | 8/1992 | Owens. |
| 5,175,817 | 12/1992 | Adams et al. |
| 5,195,129 | 3/1993 | Yazawa et al. ....................... 379/157 X |
| 5,247,520 | 9/1993 | Geise et al. ............................. 370/94.1 |
| 5,386,517 | 1/1995 | Sheth et al. ............................... 395/275 |
| 5,497,373 | 3/1996 | Hulen et al. ................................ 370/79 |
| 5,546,584 | 8/1996 | Lundin et al. ............................ 395/700 |
| 5,557,749 | 9/1996 | Norris ................................. 395/200.18 |
| 5,577,209 | 11/1996 | Boyle et al. ........................ 395/200.06 |
| 5,600,643 | 2/1997 | Robrock, II ......................... 370/259 X |
| 5,602,916 | 2/1997 | Grube et al. ............................... 380/21 |
| 5,613,096 | 3/1997 | Danknick ................................ 395/500 |
| 5,630,060 | 5/1997 | Tang et al. .......................... 395/200.01 |
| 5,655,152 | 8/1997 | Ohnishi et al. .......................... 395/856 |
| 5,671,400 | 9/1997 | Kiggens et al. ......................... 395/500 |
| 5,699,513 | 12/1997 | Feigen et al. ....................... 395/187.01 |

FOREIGN PATENT DOCUMENTS

| 0 494 576 A1 | 7/1992 | European Pat. Off. |
| 0 596 648 A1 | 5/1994 | European Pat. Off. |

OTHER PUBLICATIONS

European Search Report, Sep. 23, 1998.

*Primary Examiner*—Bernarr E. Gregory
*Attorney, Agent, or Firm*—Finnegan, Henderson, Farabow, Garrett & Dunner, L.L.P.

[57] ABSTRACT

A data exchange unit is arranged in a server. Service data provided as an application service is converted into a predetermined format on the basis of the attribute data of a terminal as a communication partner and transmitted. With this processing, the application service can be provided while absorbing the relative difference in processing capability terminals. When the service data is converted into a predetermined format on the basis of the attribute of a communication network connected to the terminal and transmitted, the application service can be provided while absorbing the relative difference in communication capability among communication networks.

112 Claims, 24 Drawing Sheets

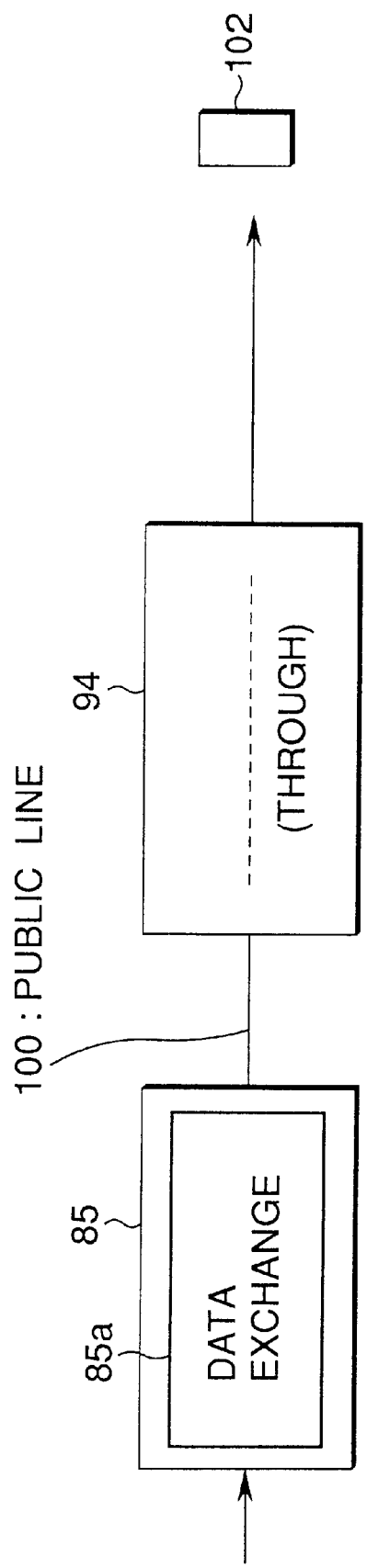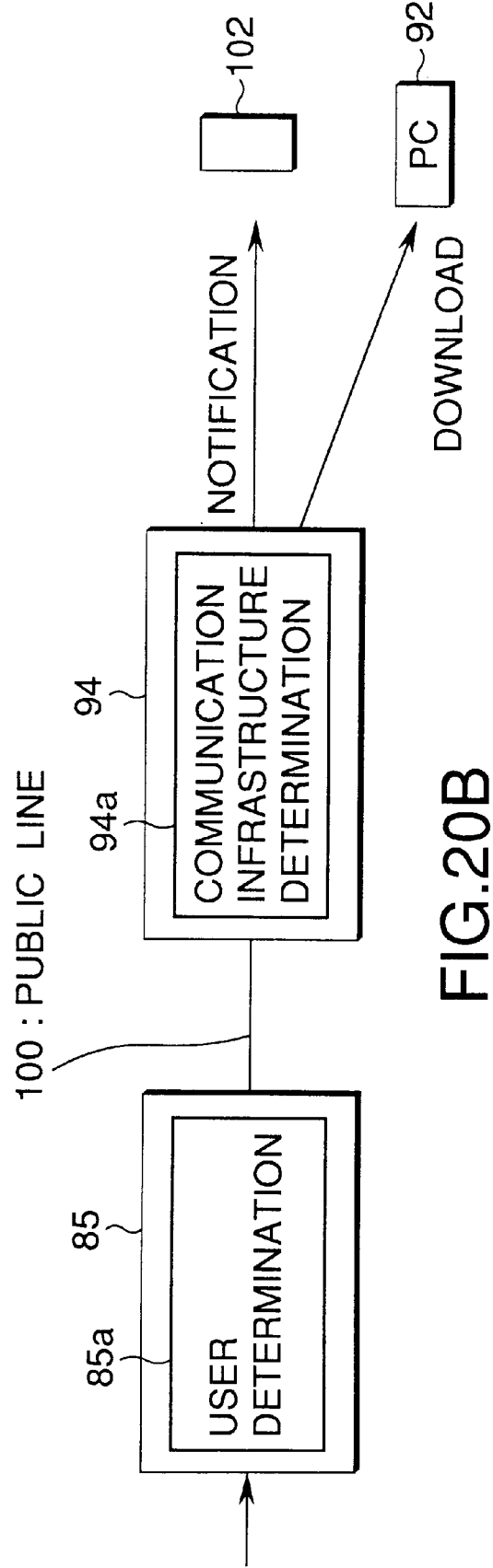

STRUCTURED DOCUMENT

A B C

X Y Z

DISTRIBUTED NETWORK COMPUTING SYSTEM, AND DATA EXCHANGE APPARATUS AND METHOD AND STORAGE MEDIUM USED IN THIS SYSTEM

BACKGROUND OF THE INVENTION

The present invention relates to a distributed network computing system for connecting a plurality of terminals and, more particularly, to a distributed network computing system for providing an application service such as an inventory control service to various terminals such as PDAs, personal computers, and portable PCs having different processing capabilities and connected to a plurality of communication networks including a public network, a wired LAN (Local Area Network), and a wireless LAN, and a data exchange apparatus and method and a storage medium used in this system.

The mainstream of conventional data processing using computers is a centralized processing system in which a plurality of terminals are connected to one main computer. Inversely, in a distributed processing system, a plurality of computers are connected to form a network such that the computers can share their resources to perform efficient processing. An environment for allowing distributed processing of an application among machines of different types is called a distributed computing environment.

In a network environment where distributed computing is realized, the user need not be aware of the place of a program or data. Logically, since the entire network behaves as if it were one computer, the user can utilize desired data or function in the self operation environment.

Assume a system for providing an application service such as an inventory control service to each terminal in the above-described network. The user terminals have different processing capabilities (the capability is called a terminal attribute, including not only the capability of the CPU but also the display screen size and the memory capacity). To absorb the difference, a manual data operation must be performed on the terminal side or on the server side.

Each terminal is connected to, e.g., a public network or a wired or wireless LAN. That is, these terminals use different communication networks. Therefore, the data transmission rate, the transmission volume, and the quality change relative to each other in units of communication networks as communication infrastructures.

Generally, assuming that a personal computer as a general-purpose device has a high-level processing capability, a PDA has an intermediate-level processing capability, and other terminals have a low-level processing capability. As for the communication infrastructures, the transmission volume and quality of a wired or wireless LAN are at a high level. Those of an ISDN (Integrated Services Digital Network) are at an intermediate level, and those of an analog wired network, or an analog or digital wireless network are at a low level.

In the network environment, the processing capability changes in units of terminals, and the communication capability changes in units of communication infrastructures. Therefore, it is very difficult to commonly provide an application service to various terminals in such an environment.

Generally, the attribute of each terminal used in the system is determined at the time of system designing, and the application service is provided in accordance with the attribute. For this reason, even when a terminal having a new attribute has been developed, the terminal can hardly be introduced into the system and used.

To provide a service while absorbing the difference in processing capability among the terminals or the difference in communication capability among the communication infrastructures, cumbersome processing must be performed. Accordingly, a large server computer having an adequate capability is required.

An establishment such as a company or a factory must be equipped with an exchange system for performing exchange/connection between extension telephones and between an extension telephone and a subscriber telephone line (main wire). Generally, a private exchange system or private exchange equipment is referred to as a PBX (Private Branch exchange) and, particularly, a digital private exchange system is called a digital PBX. The digital PBX converts a speech signal into a digital signal and processes the digital signal. When OA devices such as a personal computer, a wordprocessor, and other computers used in the office are connected to the digital PBX, data and speech signals can be uniquely and efficiently processed. In addition, when various network functions are added to the digital PBX, a wide area network can be constituted from an intra office communication network.

When a LAN is constituted for the first time, several computing devices are connected to one Ethernet cable (coaxial cable) in many cases. However, as the network expands and the number of connected devices increases, the physical length of the cable reaches the limit. As a means for physically and logically expanding the network beyond the limit of the cable, a router or the like is used.

The router can constitute a network having a closed loop. The router determines an optimum route (routing) and passes only necessary packets therethrough. The router determines the route in accordance with a network number in an internet protocol (network layer) and then in accordance with a node number, and determines the final destination.

Since the internet protocol in the network layer is defined in units of protocols including TCP/IP and OSI, the router basically supports one protocol. In other words, the router can select only a network corresponding to a specific protocol from backbone networks with a plurality of protocols. For this reason, the router can be effectively used to meet a requirement for a decrease in load factor from the Ethernet to the line due to the speed.

Conventionally, however, no system has been proposed yet to provide the service while absorbing the difference in processing capability among the terminals or the difference in communication capability among the communication infrastructures on a network connection apparatus such as an exchange system or a router.

On the other hand, a system for managing a large quantity of data is necessary. In the WWW (World Wide Web) which is becoming popular on the internet, a structuring language (tag language) called HTML (Hyper Text Markup Language) is used. As a structuring language other than HTML, SGML (Standard Generalized Markup Language) may be widely used along with the popularization of CALS (Continuous Acquisition and Lifecycle Support).

To display a document formed in the structuring language, a function (browser) of analyzing and displaying the structuring language is required on the terminal side. In other words, data described in the structuring language cannot be provided to a terminal without the browser function.

When data described in the structuring language is directly transmitted on the network, a large quantity of data is transmitted even through a line having a low transmission capability, and this transmission takes a long time. These problems also apply to a component data format such as OLE (Object Linking and Embedding) in addition to HTML.

BRIEF SUMMARY OF THE INVENTION

It is an object of the present invention to provide a distributed network computing system capable of providing, in a network environment with various terminals, an application service corresponding to the processing capability of each terminal, and even when a plurality of communication infrastructures exist, providing an application service corresponding to the communication capability of each communication infrastructure, and a data exchange apparatus and method and a storage medium used in this system.

It is another object of the present invention to provide a distributed network computing system capable of providing, in a network environment with various terminals, an application service corresponding to the processing capability of each terminal without using any large server computer, and even when a plurality of communication infrastructures exist, providing an application service corresponding to the communication capability of each communication infrastructure, and a data exchange method.

It is still another object of the present invention to provide a distributed network computing system capable of providing, in a network environment with various terminals, a service while absorbing/adjusting a difference in processing capability among terminals or a difference in communication capability among communication infrastructures on a network connection apparatus such as an exchange system or a router, and a data exchange method.

It is still another object of the present invention to provide a distributed network computing system capable of providing, in a network environment with various terminals, an application service corresponding to the processing capability of each terminal when data such as a structured document described by a component data format as the application service, and even when a plurality of communication infrastructures exist, providing an application service corresponding to the communication capability of each communication infrastructure, and a data exchange apparatus and method and a storage medium used in this system.

(1) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises terminal attribute data management means for managing terminal attribute data representing a processing capability of the terminal, conversion means for acquiring the terminal attribute data of the terminal as a communication partner from the terminal attribute data management means and converting service data provided as the application service into a specific format on the basis of the terminal attribute data, and communication means for transmitting through the communication network the service data converted by the communication means.

According to this arrangement, when a plurality of terminals are present on a network, service data provided by the data processing unit is converted in correspondence with the processing capability of each terminal. In this case, the data exchange process means processing of changing the format of certain data in correspondence with the processing capability of a terminal as a communication partner. For example, in transmitting image data (image), if the partner terminal has no image processing capability, the image data is converted into symbol data and transmitted.

With this processing, a terminal (e.g., a PDA (Personal Digital Assistants)) which is excellent in portability but poor in data processing capability (arithmetic capability) or screen display/user interface providing capability relative to other terminals (e.g., personal computers) can be used to constitute a distributed network computing system. The terminal can receive the same service as that for the remaining terminals although the data format is different.

Particularly, when this data exchange process is performed by network connection means (e.g., a line exchange system or a router), the data can be converted into a final format near the user terminal. More specifically, when a network is constituted by subnetworks, the data exchange process can be performed in correspondence with the subnetwork.

In addition, when a function of managing terminal attribute data necessary for data exchange is distributed to a second data processing unit (server computer), the processing load on the first data processing unit can be reduced, thus realizing a fail-safe system.

(2) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises communication infrastructure data management means for managing communication infrastructure data representing a communication capability of the communication network, conversion means for acquiring the communication infrastructure data of the communication network connected to the terminal as a communication partner from the communication infrastructure data management means and converting service data provided as the application service into a specific format on the basis of the communication infrastructure data, and communication means for transmitting through the communication network the service data converted by the communication means.

According to this arrangement, when a plurality of communication networks are present on a network, service data provided by the data processing unit is converted in correspondence with the communication capability of each communication network. In this case, the data exchange process means processing of changing the format of certain data in correspondence with the communication capability of a communication network connected to a terminal as a communication partner. For example, if the data transmission capability of the communication network is high, the data is enciphered and transmitted. If the data transmission capability is low, the transmission data size is changed by converting binary data into text data, converting format data such as centering into a blank character, or neglecting the font data, and thereafter, the data is transmitted. When the data transmission capability is low, and the terminal side has an appropriate arithmetic capability, the data may be compressed and transmitted.

With this processing, even in a system having various communication infrastructures, the relative difference in data transmission rate/volume/quality among the communication infrastructures can be absorbed. The terminal can receive the same service as that for the remaining terminals although the data format is different.

(3) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises terminal attribute data management means for managing terminal attribute data representing a processing capability of the terminal, communication infrastructure data management means for managing communication infrastructure data representing a communication capability of the communication network, conversion means for acquiring the terminal attribute data of the terminal as a communication partner from the terminal attribute data management means and simultaneously acquiring the communication infrastructure data of the communication network connected to the terminal from the communication infrastructure data management means, and converting service data provided as the application service into a specific format on the basis of the terminal attribute data and the communication infrastructure data, and communication means for transmitting through the communication network the service data converted by the communication means.

According to this arrangement, when a plurality of terminals and a plurality of communication networks are present on a network, service data provided by the data processing unit is converted in correspondence with the processing capability of each terminal and the communication capability of each communication network. In this case, the data exchange process means processing of changing the format of certain data in correspondence with the processing capability of a terminal as a communication partner and the communication capability of a communication network connected to the terminal.

With this processing, even in a system having various communication infrastructures, the relative difference in data transmission rate/volume/quality among the communication infrastructures can be absorbed. The terminal can receive the same service as that for the remaining terminals although the data format is different.

(4) According to the present invention, in a distributed network computing system including a first data processing unit for providing an application service, a terminal for receiving the application service from the first data processing unit, and a communication network which connects the first data processing unit and the terminal, communication infrastructure data management means for managing communication infrastructure data representing a communication capability of the communication network is arranged in a second data processing unit connected to the communication network independently of the first data processing unit.

The first data processing unit comprises retrieval means for retrieving the second data processing unit having the communication infrastructure data management means from one or a plurality of second data processing units, conversion means for acquiring the communication infrastructure data corresponding to the terminal as a communication partner from the communication infrastructure data management means and converting service data provided as the application service into a specific format on the basis of the communication infrastructure data in the second data processing unit retrieved by the retrieval means, and communication means for transmitting through the communication network the service data converted by the conversion means.

According to this arrangement, when a plurality of communication networks are present on a network, service data provided by the first data processing unit (main server computer for providing the application service) is converted in correspondence with the communication capability of each communication network. In this case, the data exchange process means processing of changing the format of certain data in correspondence with the communication capability of a communication network connected to a terminal as a communication partner. For example, if the data transmission capability of the communication network is high, the data is enciphered or compressed and transmitted. If the data transmission capability is low, the transmission data size is changed by converting binary data into text data, converting format data such as centering into a blank character, or neglecting the font data, and thereafter, the data is transmitted. When the data transmission capability is low, and the terminal side has an appropriate arithmetic capability, the data may be compressed and transmitted.

In addition, when a function of managing communication infrastructure data necessary for data exchange is distributed to the second data processing unit (subserver computer), the processing load on the first data processing unit can be reduced, thus realizing a fail-safe system.

(5) According to the present invention, in a distributed network computing system including a first data processing unit for providing an application service, a terminal for receiving the application service from the first data processing unit, and a communication network which connects the first data processing unit and the terminal, terminal attribute data management means for managing terminal attribute data representing a processing capability of the terminal and communication infrastructure data management means for managing communication infrastructure data representing a communication capability of the communication network are arranged in a second data processing unit connected to the communication network independently of the first data processing unit.

The first data processing unit comprises retrieval means for retrieving the second data processing unit having the terminal attribute data management means and the communication infrastructure data management means from one or a plurality of second data processing units, conversion means for acquiring the terminal attribute data of the terminal as a communication partner from the terminal attribute data management means and simultaneously acquiring the communication infrastructure data corresponding to the terminal as the communication partner from the communication infrastructure data management means, and converting service data provided as the application service into a specific format on the basis of the terminal attribute data and the communication infrastructure data in the second data processing unit retrieved by the retrieval means, and communication means for transmitting through the communication network the service data converted by the conversion means.

With this arrangement, when a function of managing terminal attribute data or communication infrastructure data necessary for data exchange is distributed to the second data processing unit (subserver computer), the processing load on the first data processing unit can be reduced, thus realizing a fail-safe system.

(6) According to the present invention, in a distributed network computing system including a data processing unit for providing an application service of various application software, a terminal for receiving the application service from the data processing unit, and a communication network which connects the data processing unit and the terminal, a data exchange unit is arranged in network connection means for connecting networks to each other.

This data exchange unit comprises communication infrastructure data management means for managing communication infrastructure data representing a communication capability of the communication network, conversion means for acquiring the communication infrastructure data of the communication network connected to the terminal as a communication partner from the communication infrastructure data management means and converting service data provided as the application service into a specific format on the basis of the communication infrastructure data, and communication means for transmitting through the communication network the service data converted by the communication means.

When this data exchange process is performed by the network connection means (e.g., a line exchange system or a router), the data can be converted into a final format near the user terminal. More specifically, when a network is constituted by subnetworks, the data exchange process can be performed in correspondence with the subnetwork.

(7) The data exchange unit comprises terminal attribute data management means for managing terminal attribute data representing a processing capability of the terminal, communication infrastructure data management means for managing communication infrastructure data representing a communication capability of the communication network, conversion means for acquiring the terminal attribute data of the terminal as a communication partner from the terminal attribute data management means and simultaneously acquiring the communication infrastructure data of the communication network connected to the terminal from the communication infrastructure data management means, and converting service data provided as the application service into a specific format on the basis of the terminal attribute data and the communication infrastructure data, and communication means for transmitting through the communication network the service data converted by the communication means.

According to this arrangement, when a plurality of terminals and a plurality of communication networks are present on a network, service data provided by the data processing unit is converted in correspondence with the processing capability of each terminal and the communication capability of each communication network. In this case, the data exchange process means processing of changing the format of certain data in correspondence with the processing capability of a terminal as a communication partner and the communication capability of a communication network connected to the terminal.

With this processing, when this data exchange process is performed by network connection means (e.g., a line exchange system or a router), the data can be converted into a final format near the user terminal. More specifically, when a network is constituted by subnetworks, the data exchange process can be performed in correspondence with the subnetwork.

(8) The data exchange unit comprises analysis means for analyzing service data described in a structured document format such as HTML as a component data format, terminal attribute data management means for managing terminal attribute data representing a processing capability of the terminal, conversion means for acquiring the terminal attribute data of the terminal as a communication partner from the terminal attribute data management means and converting the service data analyzed by the analysis means into a specific format on the basis of the terminal attribute data, and communication means for transmitting through the communication network the service data converted by the communication means.

With this arrangement, when the service data is described in a component data format such as HTML or OLE, the data exchange process according to the terminal attribute can be performed in units of component data by analyzing the service data and checking the types and data sizes of the components constituting the document.

In this case, even when the service data provided as the application service is described in a non-component data format (e.g., binary data), the same data exchange process as described above can be performed by temporarily converting the service data into the component data format.

The data exchange unit comprises analysis means for analyzing service data described in a structured document format such as HTML as a component data format, communication infrastructure data management means for managing communication infrastructure data representing a communication capability of the communication network, conversion means for acquiring the communication infrastructure data of a communication network connected to the terminal as a communication partner from the communication infrastructure data management means and converting the service data analyzed by the analysis means into a specific format on the basis of the communication infrastructure data, and communication means for transmitting through the communication network the service data converted by the communication means.

According to this arrangement, when a plurality of communication networks are present on a network, service data provided by the data processing unit is converted in correspondence with the communication capability of each communication network. In this case, the data exchange process means processing of changing the format of certain data in correspondence with the communication capability of a communication network connected to a terminal as a communication partner. For example, if the data transmission capability of the communication network is high, the data is enciphered and transmitted. If the data transmission capability is low, the transmission data size is changed by converting binary data into text data, converting format data such as centering into a blank character, or neglecting the font data, and thereafter, the data is transmitted. When the data transmission capability is low, and the terminal side has an appropriate arithmetic capability, the data may be compressed and transmitted.

In addition, when the service data is described in a component data format such as HTML or OLE, the data exchange process according to the terminal attribute can be performed in units of component data by analyzing the service data and checking the types and data sizes of the components constituting the document.

In this case, even when the service data provided as the application service is described in a non-component data format (e.g., binary data), the same data exchange process as described above can be performed by temporarily converting the service data into the component data format.

The data exchange unit comprises analysis means for analyzing service data described in a structured document format such as HTML as a component data format, terminal attribute data management means for managing terminal attribute data representing a processing capability of the terminal, communication infrastructure data management means for managing communication infrastructure data representing a communication capability of the communication network, conversion means for acquiring the terminal attribute data of the terminal as a communication partner from the terminal attribute data management means and simultaneously acquiring the communication infrastructure data of a communication network connected to the terminal partner from the communication infrastructure data management means, and converting the service data analyzed by the analysis means into a specific format, and communication means for transmitting through the communication network the service data converted by the communication means.

According to this arrangement, when a plurality of terminals and a plurality of communication networks are present on a network, service data provided by the data processing unit is converted in correspondence with the processing capability of each terminal and the communication capability of each communication network. In this case, the data exchange process means processing of changing the format of certain data in correspondence with the processing capability of a terminal as a communication partner and the communication capability of a communication network connected to the terminal.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 20A and 20B are block diagrams for explaining processing operations performed when a PBX in the third embodiment has a data exchange function;

DETAILED DESCRIPTION OF THE INVENTION

An embodiment of the present invention will be described below with reference to the accompanying drawing.

Figure 1:
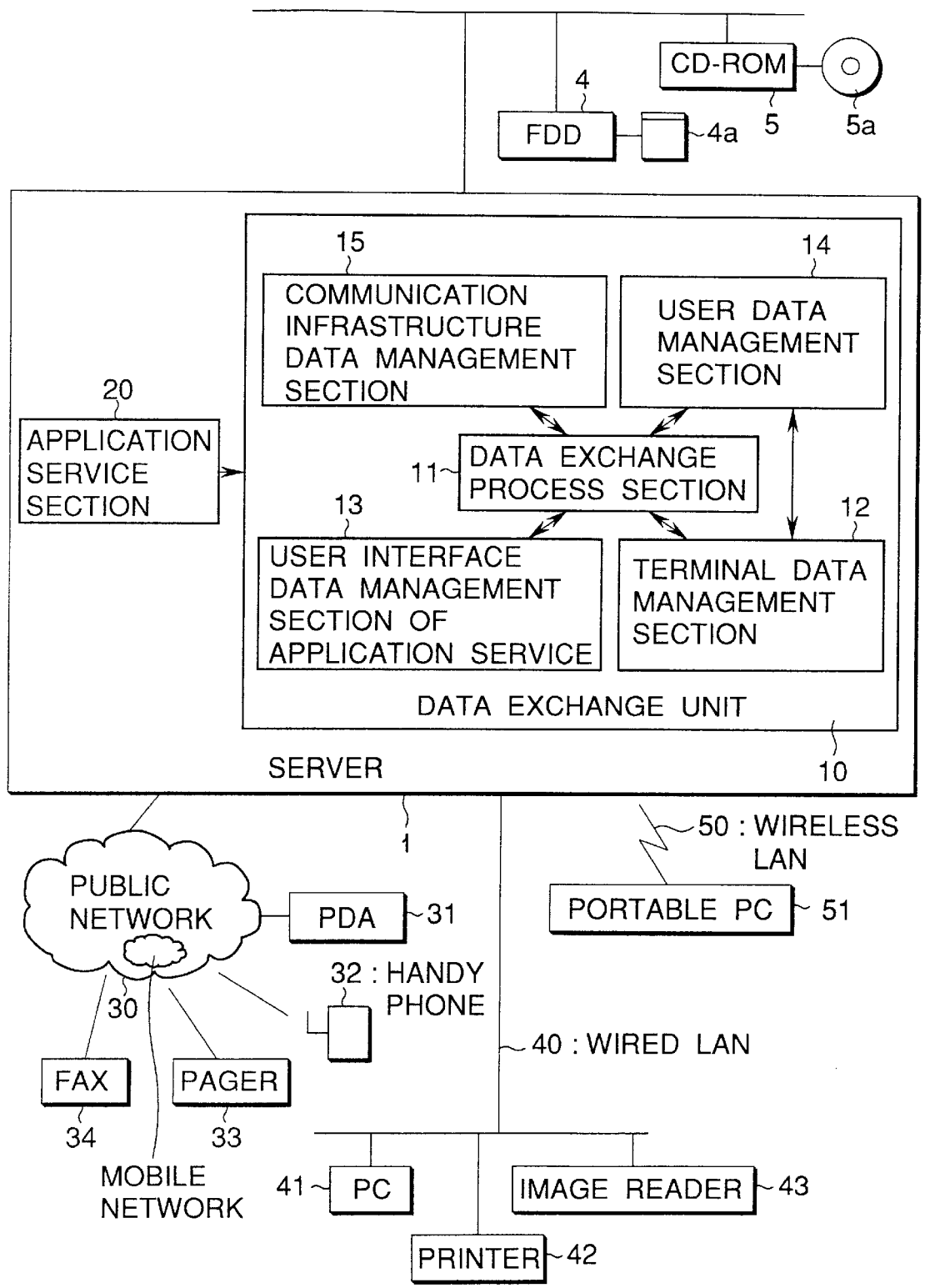
FIG. 1 is a block diagram showing the structure of a distributed network computing system according to an embodiment of the present invention.

FIG. 1 is a block diagram showing the structure of a distributed network computing system according to an embodiment of the present invention. Referring to FIG. 1, reference numeral 1 denotes a server constituted by a general-purpose computer having a high processing capability.

The server 1 is set in an office. The server 1 has an application service section 20 for providing various application services (application software) such as an inventory control service to each terminal. The services provided by the application service section 20 can be utilized by using an image reader 43 or a printer 42 (to be described later) as an I/O unit.

The server 1 is connected to three communication networks (to be referred to as communication infrastructures hereinafter) having different communication capabilities, i.e., a public network 30, a wired LAN (Local Area Network) 40, and a wireless LAN 50.

The public network 30 is connected to a PDA 31, a handy phone 32, a pager 33, a facsimile apparatus (FAX) 34. The public network 30 is an analog or digital communication network. The data transmission volume of an analog communication network is generally smaller than that of a digital communication network. The PDA 31 is connected to the server 1 through a mobile communication network contained in the public network 30. The quality of mobile communication is low not only because the data transmission volume is small but also because line disconnection or a data transmission error readily occurs due to the mobility. In this embodiment, the PDA 31 gives prominence to the portability. Accordingly, the screen size/control function is low, and only text data can be used. The processing capability of the CPU is lower than that of a personal computer. In addition, the PDA 31 has no external storage unit.

The wired LAN 40 is connected to a personal computer (to be abbreviated as PC in all FIGS.) 41, the printer 42, and the image reader 43. The wired LAN 40 generally has a large transmission data volume and a stable line quality relative to radio communication such as a handy phone service. A current distributed network application service oriented to a general office is often designed in correspondence with the wired LAN 40.

The printer 42 and the image reader 43 are set as output/input devices in the office building. For, e.g., an inventory control service, an inventory slip is read by the image reader 43, the readout data is sent to the server 1 through the wired LAN 40, and the spreadsheet result is output from the printer 42.

A portable personal computer 51 is connected to the wireless LAN 50. The wireless LAN 50 has almost the same processing capability as that of the wired LAN 40. However, the processing capability of the portable personal computer 51 connected to the wireless LAN 50 is lower than that of the personal computer 41 connected to the wired LAN 40.

As described above, in the network environment, the processing capability changes in units of terminals, and the communication capability also changes in units of communication infrastructures.

In this embodiment, a data exchange unit 10 is arranged in the server 1 such that the attributes (the difference in processing capability and the difference in communication capability) of various terminals and communication infrastructures on the network are absorbed.

The data exchange unit 10 is constituted by a data exchange process section 11, a terminal data management section 12, a user interface data management section 13 of application service, a user data management section 14, and a communication infrastructure data management section 15.

A floppy disk drive (FDD) 4 and a CD-ROM drive 5 are connected to the server 1 via a bus. A diskette 4a in the FDD 4 and a CD 5a in the CD-ROM drive 5 can store programs shown in the flow charts of FIGS. 10 to 14, FIG. 16, and FIGS. 23 to 26.

The structures of various sections of the data exchange unit 10 will be described below with reference to FIGS. 2 to 8.

Figure 2:
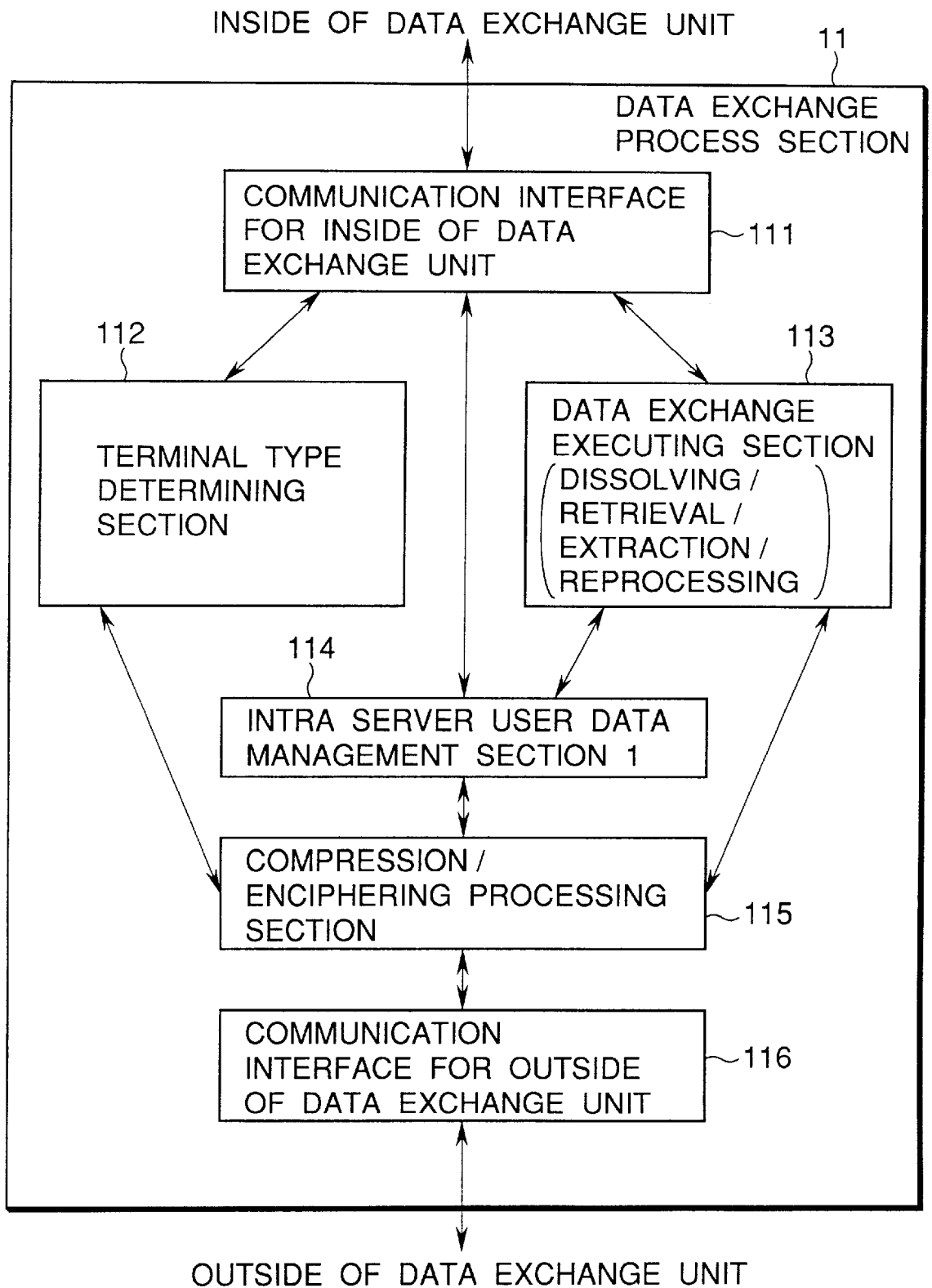
FIG. 2 is a block diagram showing the internal structure of a data exchange process section in a data exchange apparatus.

FIG. 2 is a block diagram showing the internal structure of the data exchange process section 11. The data exchange process section 11 performs a series of processing operations to convert data as an application service into another data in correspondence with the attribute of each terminal or communication infrastructure. The data exchange process section 11 is constituted by a communication interface 111 for inside of data exchange unit, a terminal type determining section 112, a data exchange executing section 113, an intra server user data management section 114, a compression/enciphering processing section 115, and a communication interface 116 for outside of data exchange unit.

The communication interface 111 for inside of data exchange unit is an interface for communication with another element in the data exchange unit 10. The terminal type determining section 112 determines the type of a user terminal (e.g., a large-screen desktop personal computer, a portable small-screen subnotebook personal computer, a PDA). The data exchange executing section 113 executes an actual data exchange process (dissolving, retrieval, extraction, and reprocessing of data). The intra server user data management section 114 manages user data registered in the server 1. The compression/enciphering processing section 115 compresses or enciphers communication data in accordance with the determination result of the terminal type determining section 112 in communication with an external device outside the data exchange unit 10. The communication interface 116 for outside of data exchange unit is an interface for communication with an external device outside the data exchange unit 10.

Figure 3:
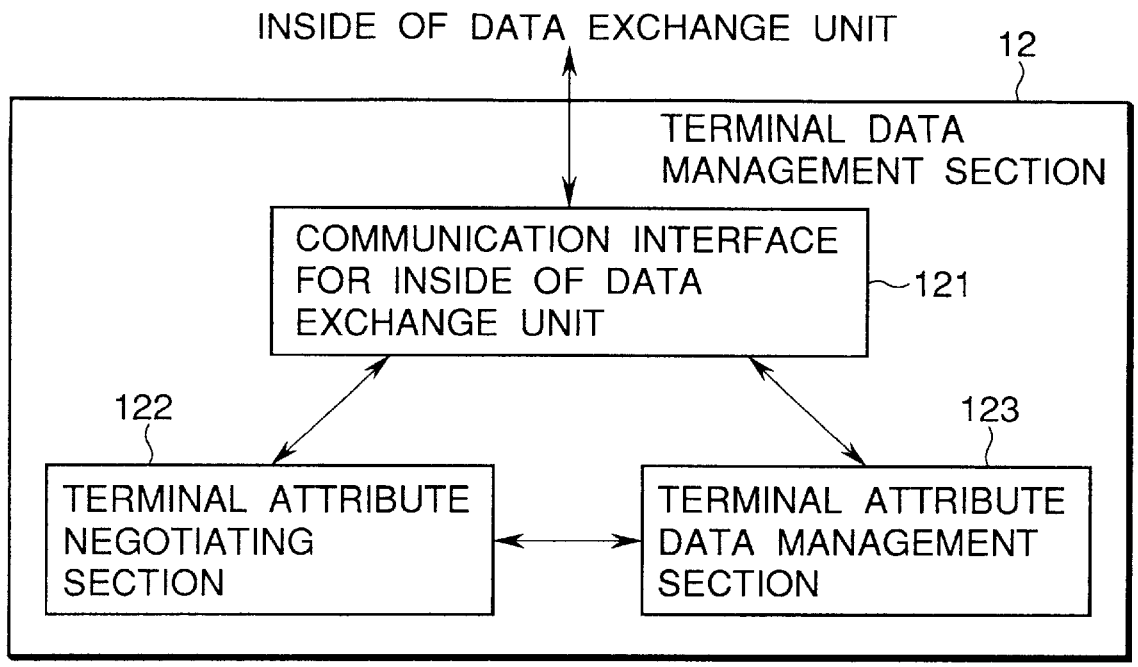
FIG. 3 is a block diagram showing the internal structure of a terminal data management section in the data exchange apparatus.

FIG. 3 is a block diagram showing the internal structure of the terminal data management section 12. The terminal data management section 12 manages attribute data representing the processing capability such as a CPU capability, a display capability, and a memory capacity of each terminal connected to the server 1. The terminal data management section 12 is constituted by a communication interface 121 for inside of data exchange unit, a terminal attribute negotiating section 122, and a terminal attribute data management section 123.

The communication interface 121 for inside of data exchange unit is an interface for communication with another element in the data exchange unit 10. The terminal attribute negotiating section 122 is an interface for various communications, i.e., negotiations about the terminal attribute between the terminal data management section 12 and the terminal. The terminal attribute data management section 123 manages/operates a terminal attribute table in which terminal attribute data of each terminal is registered.

Figure 4:
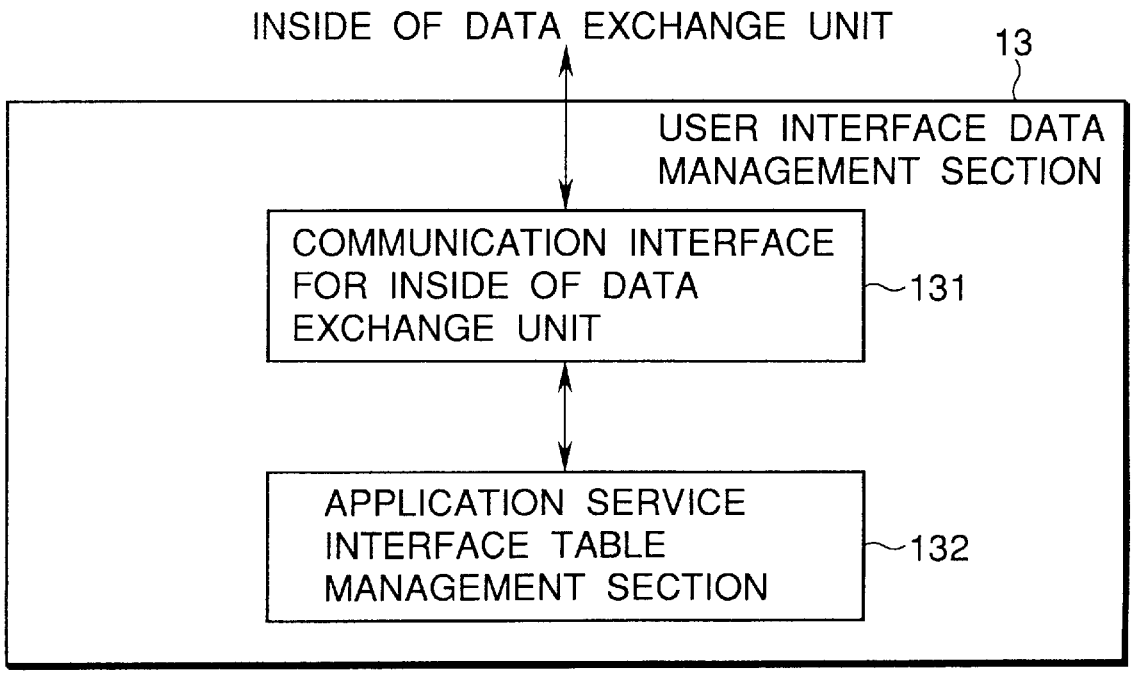
FIG. 4 is a block diagram showing the internal structure of a user interface data management section in the data exchange apparatus.

FIG. 4 is a block diagram showing the internal structure of the user interface data management section 13. When the user utilizes the application service, the method of operating the application service changes depending on the terminal, e.g., an icon or a button is operated, or a command is input on the terminal. The user interface data management section 13 manages user interface data representing an operation method unique to each terminal for the application service. The user interface data management section 13 is constituted by a communication interface 131 for inside of data exchange unit and an application service interface table management section 132.

The communication interface 131 for inside of data exchange unit is an interface for communication with another element in the data exchange unit 10. The application service interface table management section 132 manages data (e.g., an operating method for each terminal) associated with the user interface of each application service.

Figure 5:
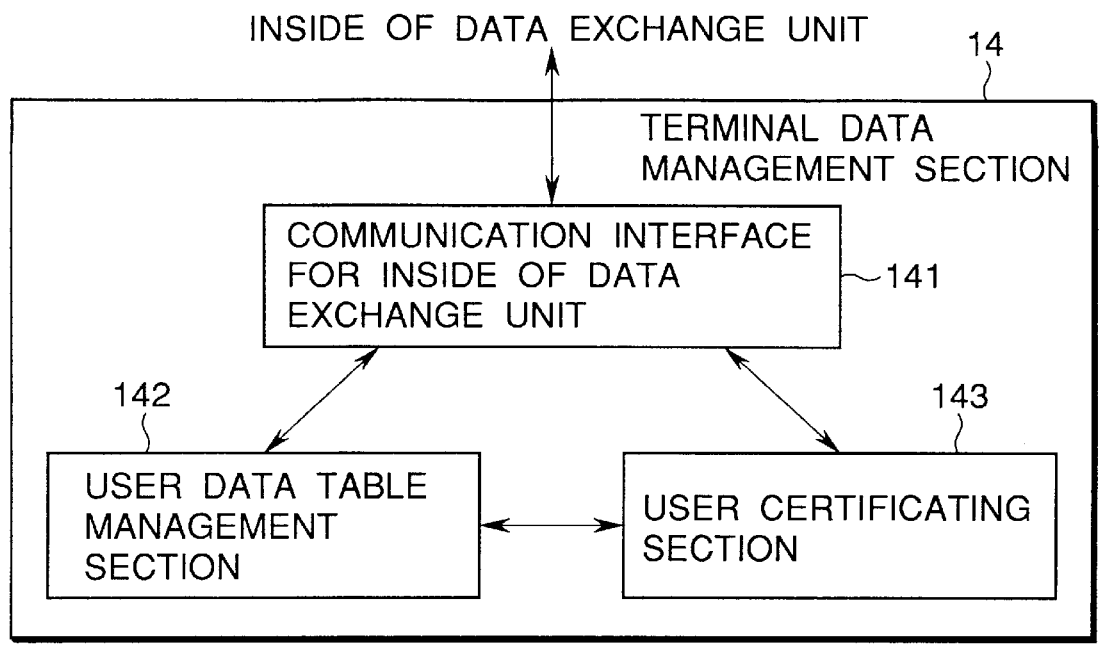
FIG. 5 is a block diagram showing the internal structure of a user data management section in the data exchange apparatus.

FIG. 5 is a block diagram showing the internal structure of the user data management section 14. In use of an application service, the preference for, e.g., screen display changes depending on the user. For example, a display object such as a graph is arbitrarily moved to a position with a better view on the terminal. The user data management section 14 manages user data representing an operation method unique to each user, including the preference for screen display in use of the application service (in this case, the user data is registered in the server in advance). The user data management section 14 is constituted by a communication interface 141 for inside of data exchange unit, a user data table management section 142, and a user certificating section 143.

The communication interface 141 is an interface for communication with another element in the data exchange unit 10. The user data table management section 142 manages associated data including the user name, the user and the terminal name, the address, and the type of communication infrastructure. The user certificating section 143 operates when a user certification is required in the data exchange unit 10.

Figure 6:
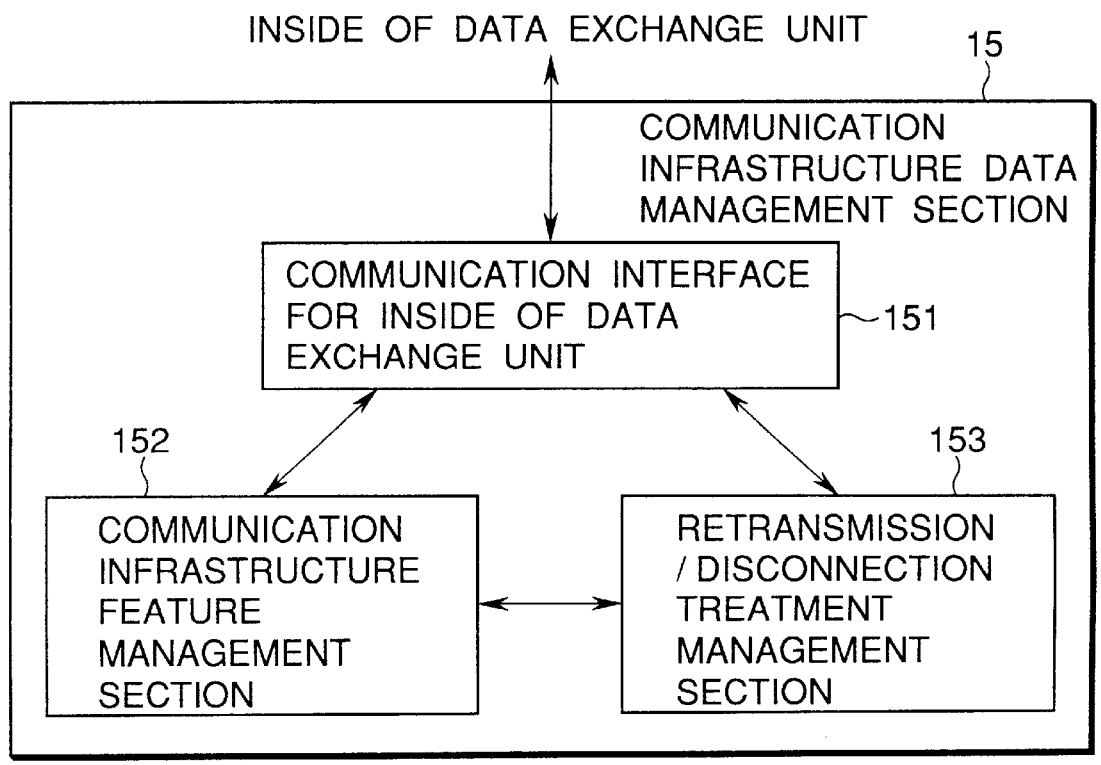
FIG. 6 is a block diagram showing the internal structure of a communication infrastructure data management section in the data exchange apparatus.

FIG. 6 is a block diagram showing the internal structure of the communication infrastructure data management section 15. The communication infrastructure data management section 15 manages attribute data representing the communication capability such as the data transmission rate, the transmission volume, and the quality of each communication network. The communication infrastructure data management section 15 is constituted by a communication interface 151 for inside of data exchange unit, a communication infrastructure feature management section 152, and a retransmission/disconnection treatment management section 153.

The communication interface 151 is an interface for communication with another element in the data exchange unit 10. The communication infrastructure feature management section 152 manages feature data including the transmission quality and the transmission rate of the communication infrastructure. The retransmission/disconnection treatment management section 153 has a function of performing a retransmission/disconnection treatment in correspondence with the communication infrastructure in use.

The operation of this embodiment will be described below.

A general processing operation of an application service, e.g., an inventory control service without using the data exchange unit 10 will be described first.

Figure 7:
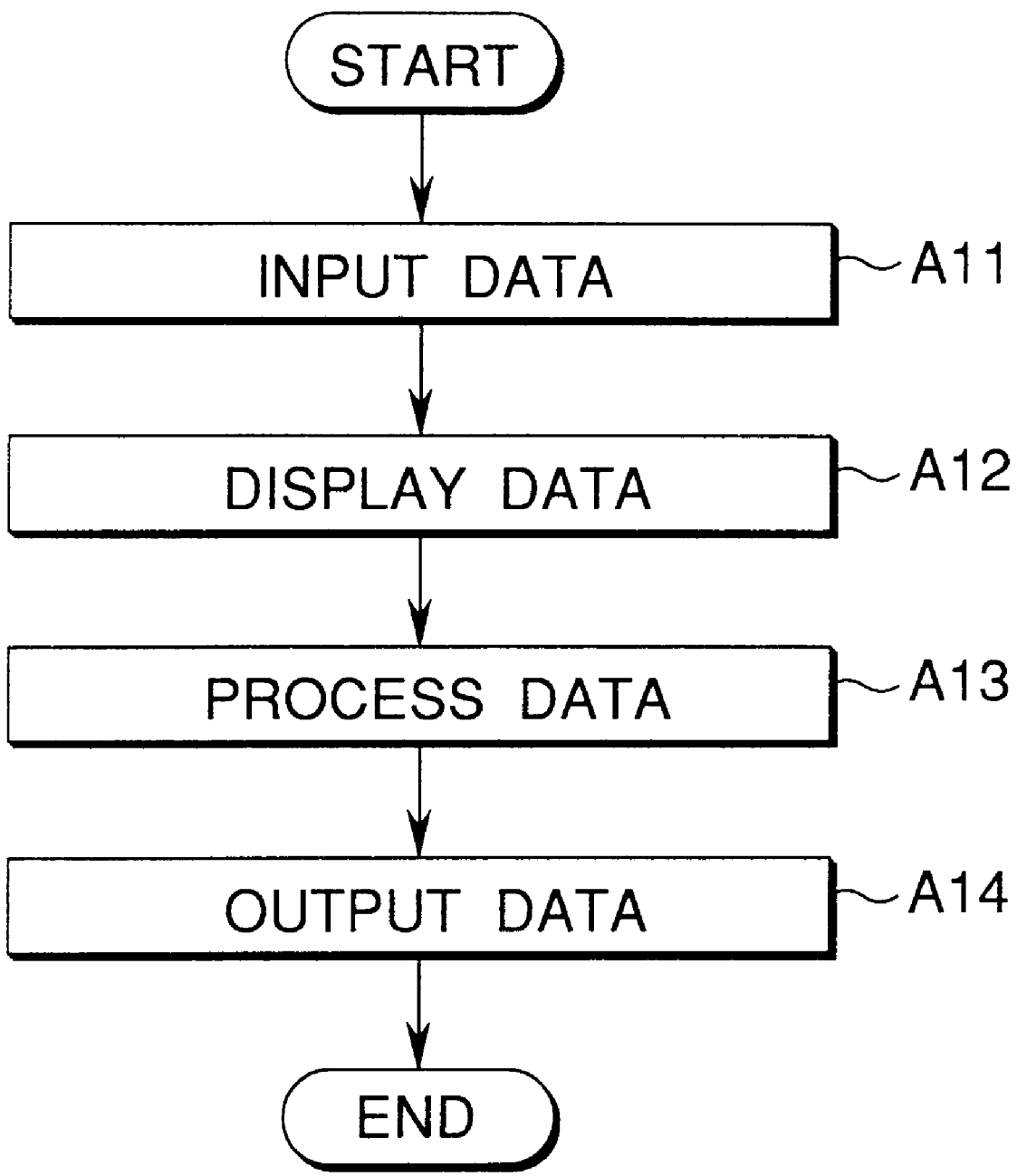
FIG. 7 is a flow chart showing a general application service processing operation.

FIG. 7 is a flow chart showing a general application service processing operation. The server 1 receives data from the image reader 43 through the wired LAN 40 and transfers data of, e.g., an inventory slip to the application service section 20 (step A11). In the server 1, the application service section 20 extracts a necessary inventory amount from the slip data read by the image reader 43, and displays the contents on the display screen of, e.g., the personal computer 41 for the user of the personal computer 41 (step A12).

With this display, the user processes the data, e.g., updates the inventory amount to the latest data, using the personal computer 41 connected to the server 1 (step A13). Upon receiving the corrected data from the user, the application service section 20 outputs the latest inventory slip reflecting the correction result to the printer 42 (step A14). With this processing, the user can obtain the latest inventory slip from the output result of the printer 42.

Such a general application service assumes that the user can use the personal computer 41, the printer 42, and the image reader 43 in the vicinity. In the example shown in FIG. 1, the personal computer 41, the printer 42, and the image reader 43 are connected to the server 1 through the wired LAN 40 in the office.

A case wherein the application service is provided to the user of the PDA 31 or portable personal computer 51 outside the office will be described next.

Figure 8:
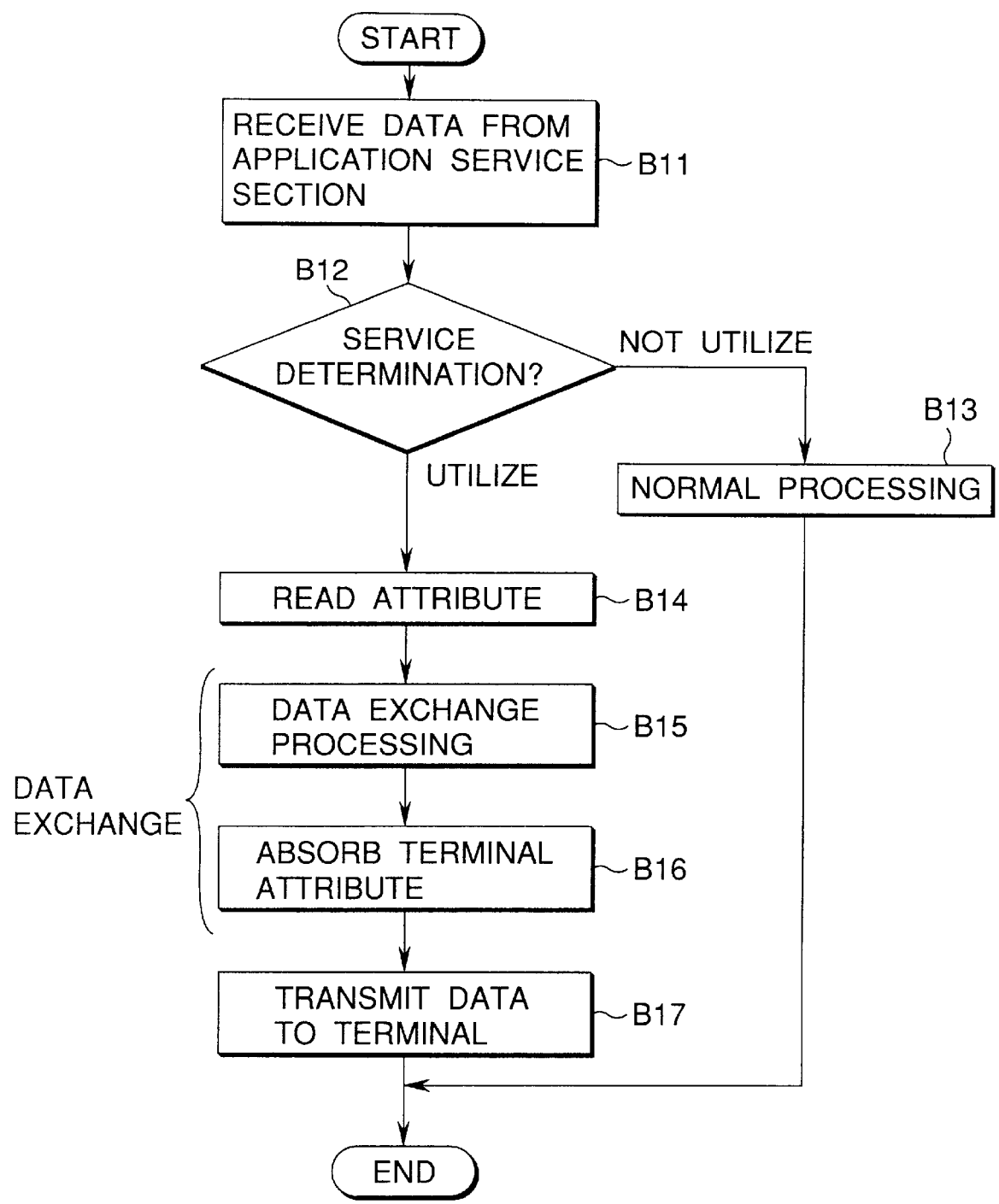
FIG. 8 is a flow chart showing an application service processing operation using the data exchange apparatus.

FIG. 8 is a flow chart showing an application service processing operation using the data exchange unit 10. The data exchange unit 10 is set next to the external interface of the application service section 20 in the server 1.

When a request is output from a terminal, the data exchange unit 10 receives the data of the terminal from the application service section 20 (step B11). When the terminal as a transmission destination is the personal computer 41 in the office, the data exchange unit 10 need not be used (step B12). The server 1 executes normal processing described in FIG. 7 (step B13).

When the transmission destination is the PDA 31 or portable personal computer 51 outside the office, a routine for executing the data exchange process by the data exchange unit 10 starts (step B12).

The data exchange unit 10 acquires terminal attribute data of the terminal from the terminal data management section 12 (step B14) and performs the data exchange process for the data received from the application service section 20 on the basis of the terminal attribute data (steps B15 and B16). In this case, the data exchange process means processing of absorbing the terminal attribute by converting the format of certain data in correspondence with the processing capability of the terminal.

For example, when image data (image) is to be transmitted to a terminal without image processing capability, the image data is converted into symbol data and sent. With this processing, the terminal can receive the same service as that for the remaining terminals although the data format is different. After the data exchange process corresponding to the terminal attribute is performed, the data exchange unit 10 sends the converted data to the terminal as service data (step B17).

The operation of reading the terminal attribute from the terminal data management section 12 will be described below. The terminal attribute includes a screen size, screen control data, and data type which can be displayed on the screen.

Two techniques are available to read the terminal attribute.

(A) The terminal attribute table is prepared in the terminal data management section 12.

(B) The terminal attribute data is acquired from the terminal.

In this embodiment, the former technique (A) is used when the terminal is the PDA 31. The latter technique (B) is used when the terminal is the portable personal computer 51. Selection of the technique (A) or (B) is determined by the terminal attribute data management section 123 upon obtaining the correspondence among the user name, the terminal address, and the communication infrastructure from the user data table management section 142 in the user data management section 14. When the terminal side has a sufficient CPU capability, and the quality of the communication line is high, the latter technique (B) is employed to negotiate with the terminal side for the terminal attribute.

Figure 9:
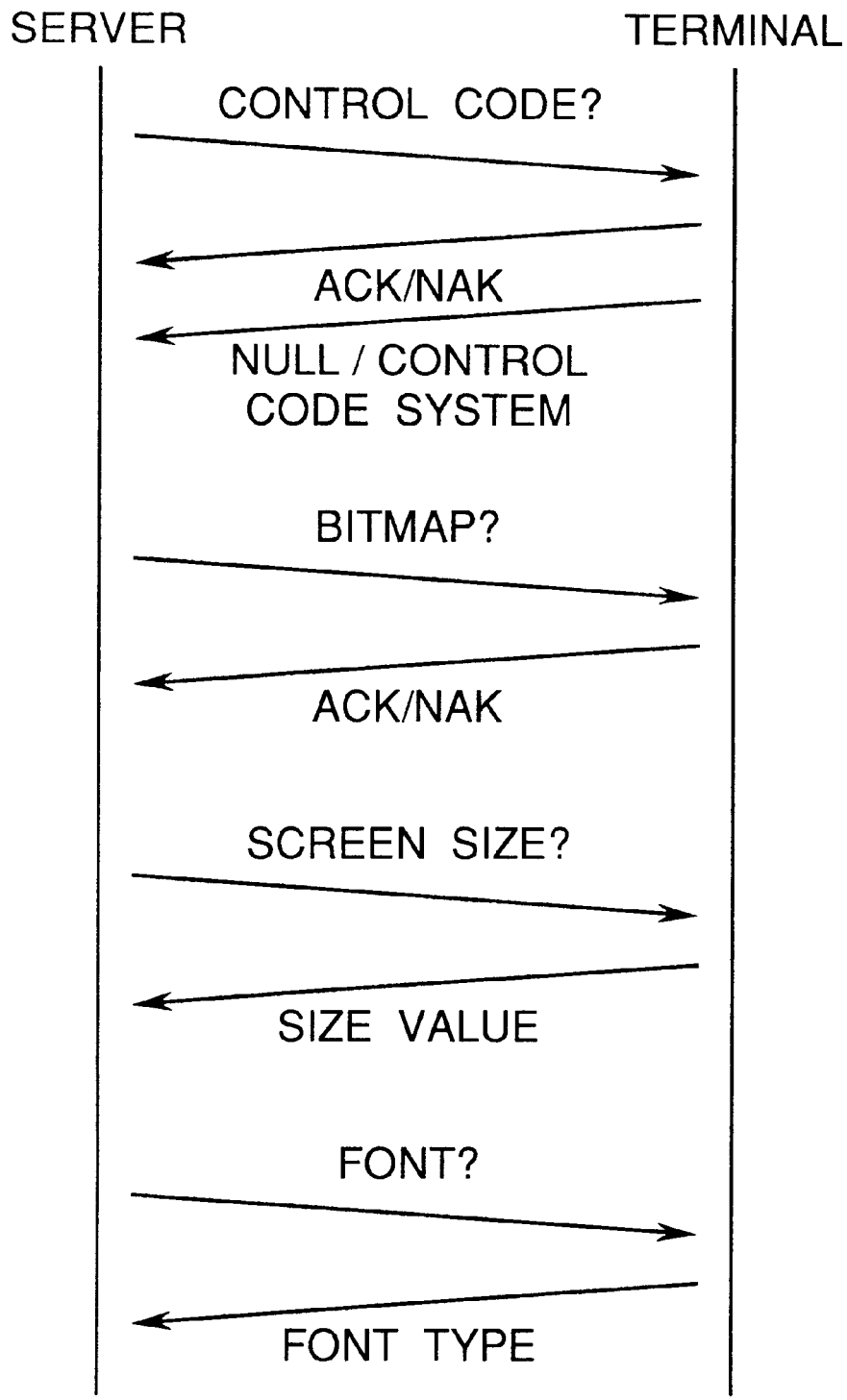
FIG. 9 is a view showing a protocol sequence for determining a terminal attribute.

For the technique (B), a protocol for determining the terminal attribute is defined between the terminal and the server (data exchange unit 10). FIG. 9 shows the concept of the protocol sequence. As shown in this protocol sequence, the terminal and the server (data exchange unit 10) confirm the control code system (the line feed code, the tab, and the like), the bitmap, the screen size, the usable font type (including the corresponding language), and the like.

The data exchange method will be described next.

The data exchange process is executed when the terminal side has no display capability, or the communication infrastructure has no sufficient data transmission capability, and the server must quantitatively/qualitatively change the data.

More specifically, the data exchange process includes the following process operations.

Conversion from binary data to text data

Conversion from image data to symbol data

Conversion from icon data to symbol data

Conversion from speech data to text data

Conversion from a color image to a monochromatic image

Conversion from binary data to text data will be described. In a document forming application, i.e., wordprocessor software used in a PC or the like, prepared document data is often stored as binary data. This is because not only the text data but also various accessory data including the document format and the font must be stored.

Generally, the size of the binary data is larger than that of simple text data. To display the binary data, not only the text display capability but also various image display capabilities are required on the terminal side. In addition, the screen size of the terminal is often designed to be small in consideration of the portability. For this reason, the document data on the server side must be processed first and displayed in many cases.

To solve this problem, the data exchange process is effectively performed. That is, the binary data is converted into text data and sent to the terminal. With this processing, the terminal can perform processing corresponding to its processing capability.

Figure 10:
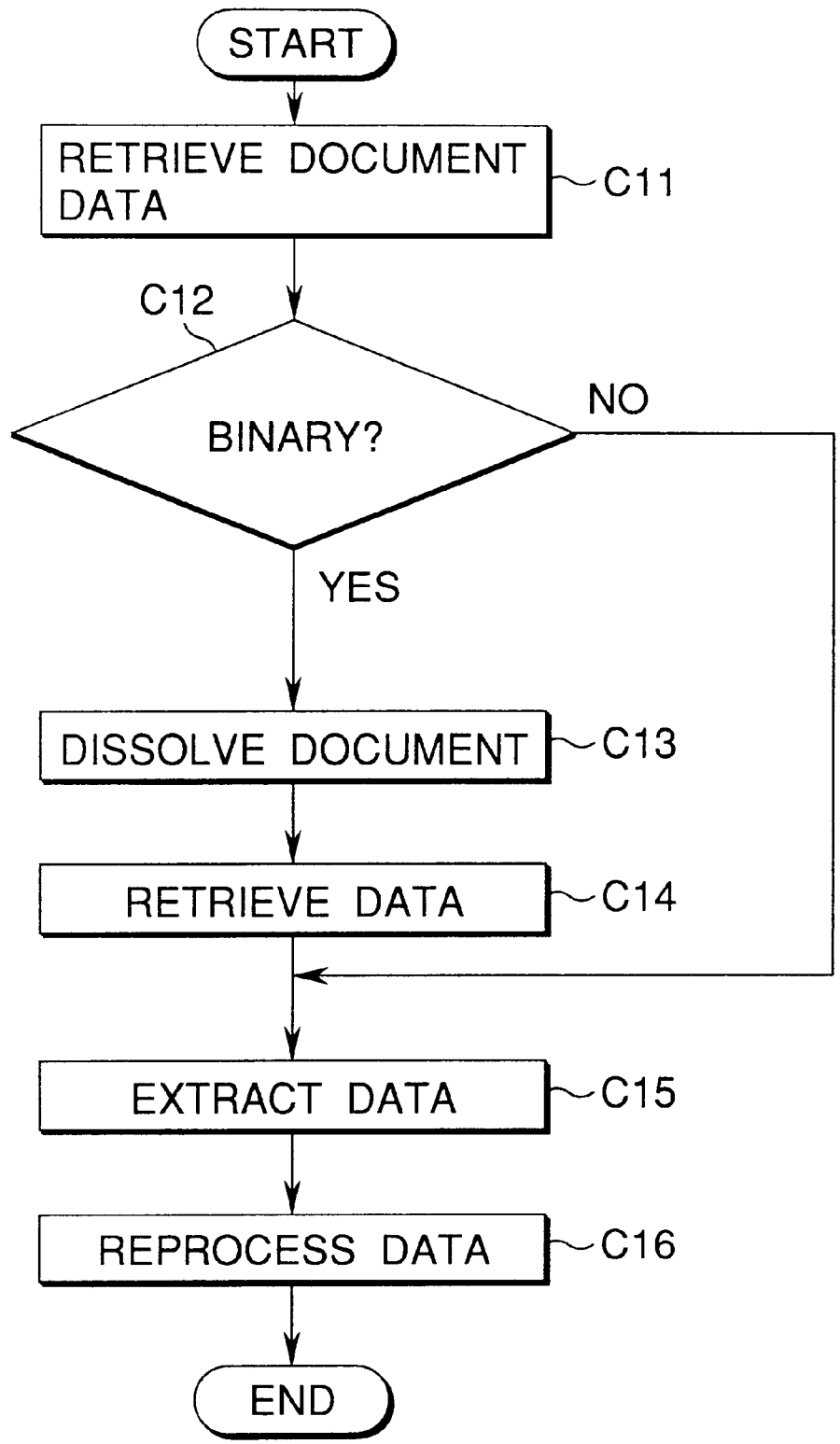
FIG. 10 is a flow chart showing a data exchange process operation corresponding to the terminal attribute.

The data exchange process operation at this time is shown in FIG. 10.

FIG. 10 is a flow chart showing the data exchange process operation corresponding to the terminal attribute. Wordprocessor software will be exemplified as the application service. The intra server user data management section 114 in the data exchange unit 10 retrieves document data and checks the format of the stored document data (step C11).

If the document data is binary data (Yes in step C12), the data exchange executing section 113 in the data exchange unit 10 dissolves the binary document data into components such as a text, a format, and a font (step C13). Necessary data is retrieved and extracted from the components (steps C14 and C15), thereby reprocessing the data to a data format corresponding to the terminal screen (step C16). The reprocessed data, i.e., the wordprocessor software service data which has undergone the data exchange process is provided to the terminal through the communication interface 116 for outside of data exchange unit.

This also applies to the remaining data exchange process operations. For example, when the terminal has no image processing capability, an image data portion is converted into symbol data, or an icon is converted into symbol data. When the terminal has no speech processing capability, speech data is converted into text data. With this processing, the service can be provided in correspondence with the processing capability of the terminal.

As described above, when a plurality of terminals are present on the network, service data provided as an application service is converted into a format corresponding to the processing capability of each terminal. With this processing, a terminal (e.g., a PDA) which is excellent in portability but poor in data processing capability (arithmetic capability) or screen display/ user interface providing capability relative to other terminals (e.g., personal computers) can be used to constitute a distributed network computing system. The terminal can receive the same service as that for the remaining terminals although the data format is different.

Such a data exchange process may be executed in accordance with the operation method of each terminal independently of the processing capability of the More specifically, when the user utilizes the application service, the method of operating the application service changes depending on the terminal, e.g., an icon or a button is operated, or a command is input on the terminal. When the operation method of each terminal is registered in the user interface data management section 13 in advance as user interface data, and the data exchange process is performed in units of terminals on the basis of the user interface data, the service can always be provided in correspondence with the operation method of each terminal.

Alternatively, the data exchange process may be executed in accordance with the preference of the terminal user.

In use of the application service, the preference for the display position changes depending on the user. For example, a graph is moved to the central position, or a text is displayed at the original position. When such preference for screen display (screen display preference data) is registered in the user data management section 14 in advance as user data, and the data exchange process is performed in units of users on the basis of the user data, the service can always be provided in correspondence with the display position of the user's preference.

A data exchange process corresponding to a communication infrastructure will be described next.

The data exchange unit 10 grasps data associated with the communication infrastructure used by the terminal user through the communication infrastructure feature management section 152 in the communication infrastructure data management section 15 or the user data table management section 142 in the user data management section 14. Data retransmission processing control is also performed on the basis of this data.

Figure 11:
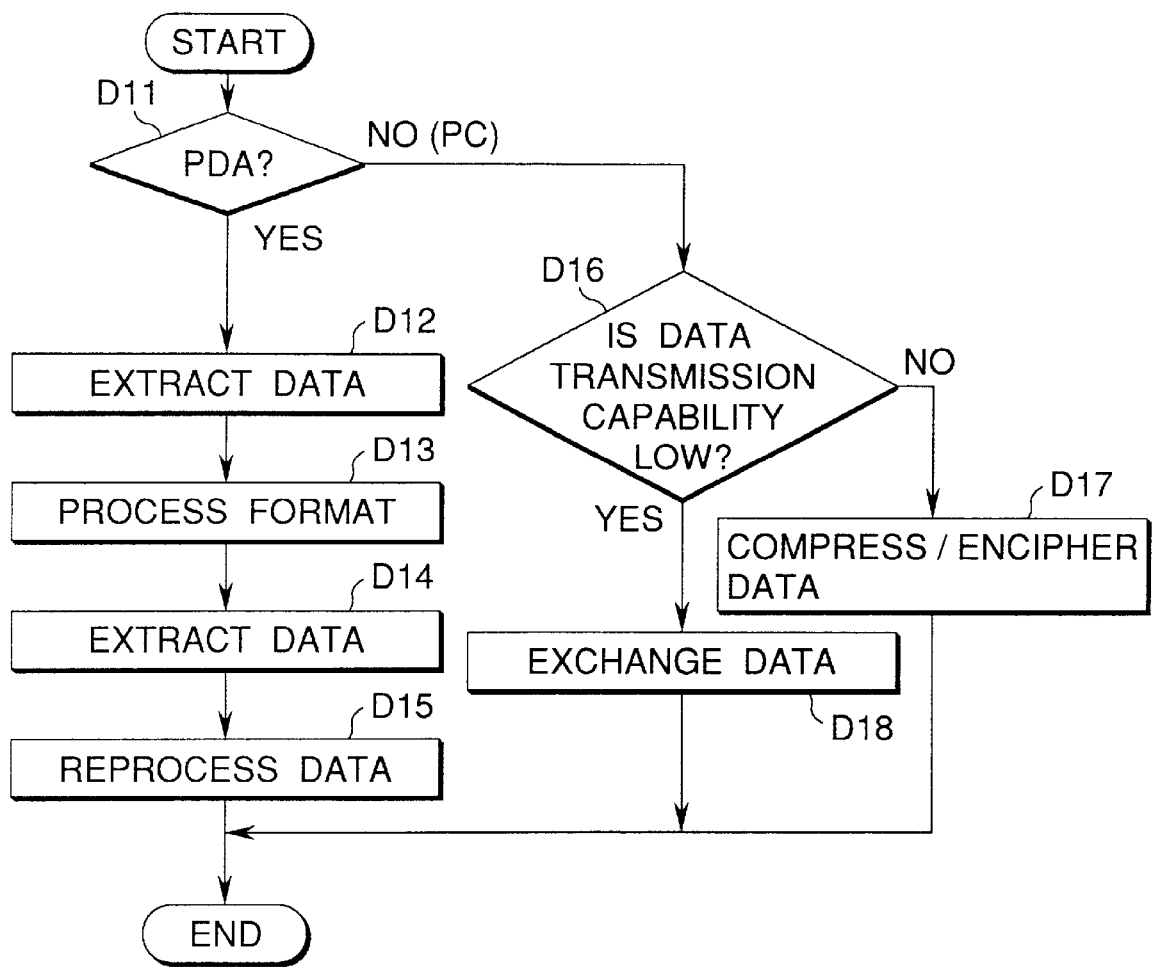
FIG. 11 is a flow chart showing a data exchange process operation corresponding to a communication infrastructure.

The data exchange process operation at this time is shown in FIG. 11.

FIG. 11 is a flow chart showing the data exchange process operation corresponding to the communication infrastructure. When the user uses the portable personal computer 51, the CPU capability of the terminal can be determined as high (No in step D11). If the data transmission capability of the communication infrastructure is high (No in step D16), the data exchange process section 11 in the data exchange unit 10 compresses/enciphers data using the compression/enciphering processing section 115 as needed and transmits the data (step D17). If the data transmission capability (transmission speed, line quality (transmission error), etc.) of the communication infrastructure is low (Yes in step D16), the data exchange process is performed to convert binary data into text data, convert format data such as centering into a blank character, or ignore format data. With this processing, the transmission data size is changed, and thereafter, the data is transmitted (step D18).

When the PDA 31 with a low CPU capability is used (Yes in step D11), the data exchange process is performed independently of the communication infrastructure, as in FIG. 10 (steps D12 to D15).

As described above, the processing capability of the terminal is checked first. If the capability is high, the communication capability of the communication infrastructure is checked, and the data exchange process corresponding to the communication capability is performed. On the other hand, assume that the terminal has a low processing capability. In this case, even when the communication infrastructure has a high communication capability, the terminal itself cannot cope with the transmitted data. Therefore, the data exchange process corresponding to the processing capability of the terminal is performed.

With this processing, even in a system having various communication infrastructures, the relative difference in data transmission rate/volume/quality among the communication infrastructures can be absorbed. Therefore, the terminal can receive the same service as that for the remaining terminals although the data format changes.

The above-described data exchange process can be realized using a recording medium on which program data describing the processing method is recorded.

More specifically, the method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

Data enciphering processing will be described below.

In use of the application service outside the office, enciphering of data is important to ensure the security of the application service. In this case, the terminal must have a capability of deciphering, so the enciphered data cannot be transmitted to all terminals. In addition, since enciphering increases the data volume, the communication infrastructure must have a high data transmission capability.

Figure 12:
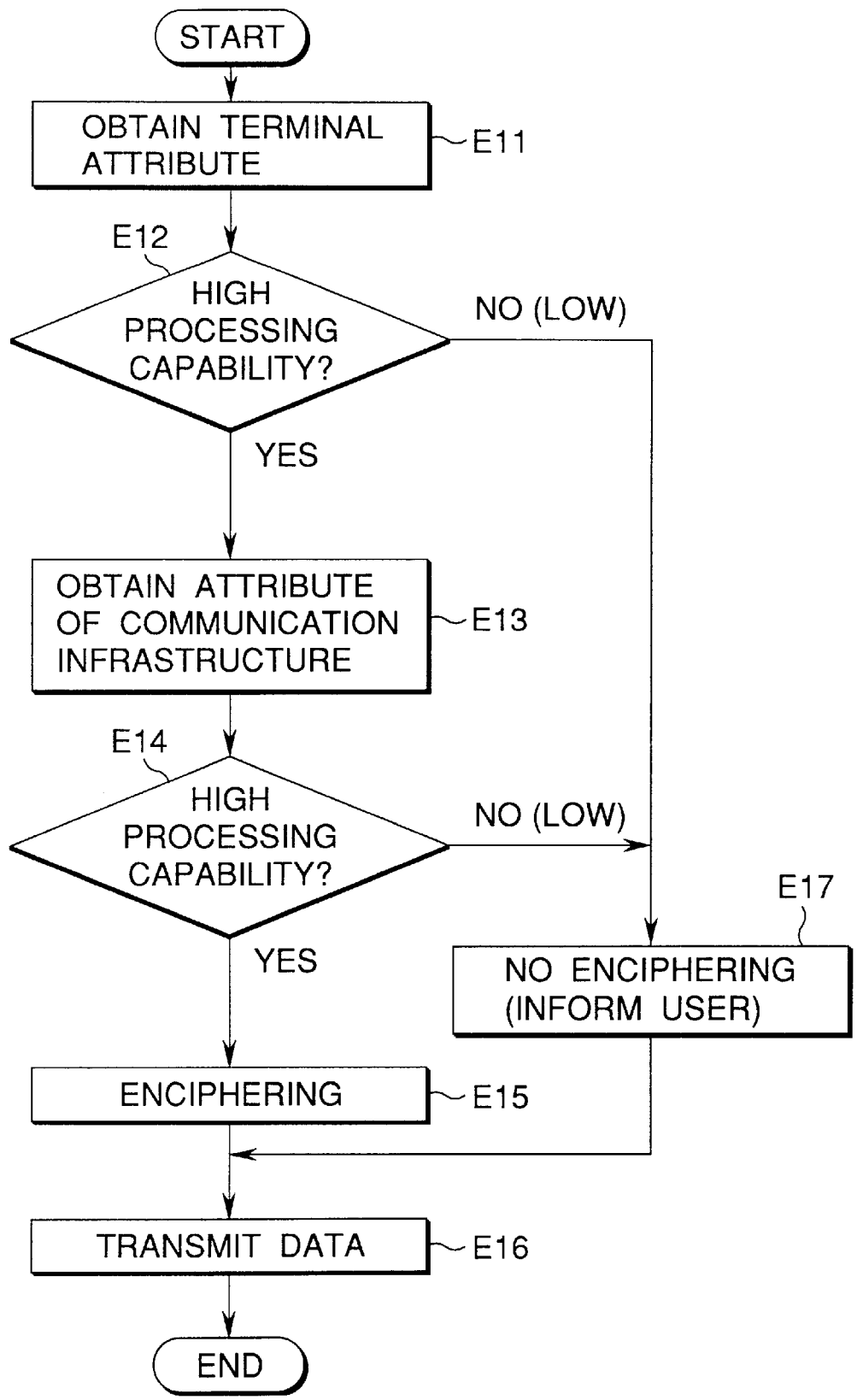
FIG. 12 is a flow chart showing a data enciphering processing operation.

The processing operation at this time is shown in FIG. 12.

FIG. 12 is a flow chart showing the data enciphering processing operation. In providing an application service of various application software by the application service section 20, the data exchange unit 10 obtains the attribute data of a terminal as a communication partner from the terminal data management section 12 (step E11), and determines the processing capability of the terminal on the basis of the attribute data (step E12).

If it is determined that the terminal has a high processing capability and a capability of deciphering enciphered data (Yes in step E12), the data exchange unit 10 obtains, from the communication infrastructure data management section 15, data of the communication infrastructure to which the terminal is connected (step E13), and determines the communication capability on the basis of the communication infrastructure data (step E14). If the communication capability is high (Yes in step E14), the data exchange unit 10 enciphers the application service data by the data exchange process section 11 (step E15), and transmits the enciphered service data to the terminal (step E16). The terminal deciphers the enciphered data and then uses the service.

If the terminal has a low processing capability and no capability of deciphering the enciphered data (No in step E12), the data exchange unit 10 directly transmits the application service data (step E16) without enciphering the data (step E17). At this time, the user may be informed of a message representing that no enciphering is performed. Alternatively, if the terminal has no capability of deciphering the enciphered data (No in step E12), the terminal side may be requested to determine whether transmission is enabled before data transmission, and transmission processing may be performed in accordance with the response.

If the terminal has a high processing capability, and the communication network connected to the terminal has a low communication capability (No in step E14), the data exchange unit 10 directly transmits the application service data (step E16) without enciphering the data (step E17). If the communication network has a low communication capability (No in step E14), the terminal side may be requested to determine whether transmission is enabled before data transmission, and transmission processing may be performed in accordance with the response.

There are various levels of data enciphering ranging from simple scrambling to advanced enciphering processing. The load on the terminal or communication infrastructure also changes depending on the enciphering level. The level of enciphering can be appropriately changed in correspondence with the processing capability of the terminal or the communication capability of the communication infrastructure.

With the data enciphering function, the security of the application service can be ensured even outside the office. In this case, enciphering can be appropriately performed by determining the type of available enciphering or the enciphered data volume which can be transmitted by the communication infrastructure in use on the basis of the terminal attribute or communication infrastructure attribute.

Data compression processing will be described next.

Data compression is effective in transmission of data in a large quantity, e.g., image data. In this case, a capability of expanding compressed data is required on the terminal side, as in the above-described data enciphering processing. The communication capability of the communication infrastructure need not be considered because compressed data can be transmitted although it takes a long time.

Figure 13:
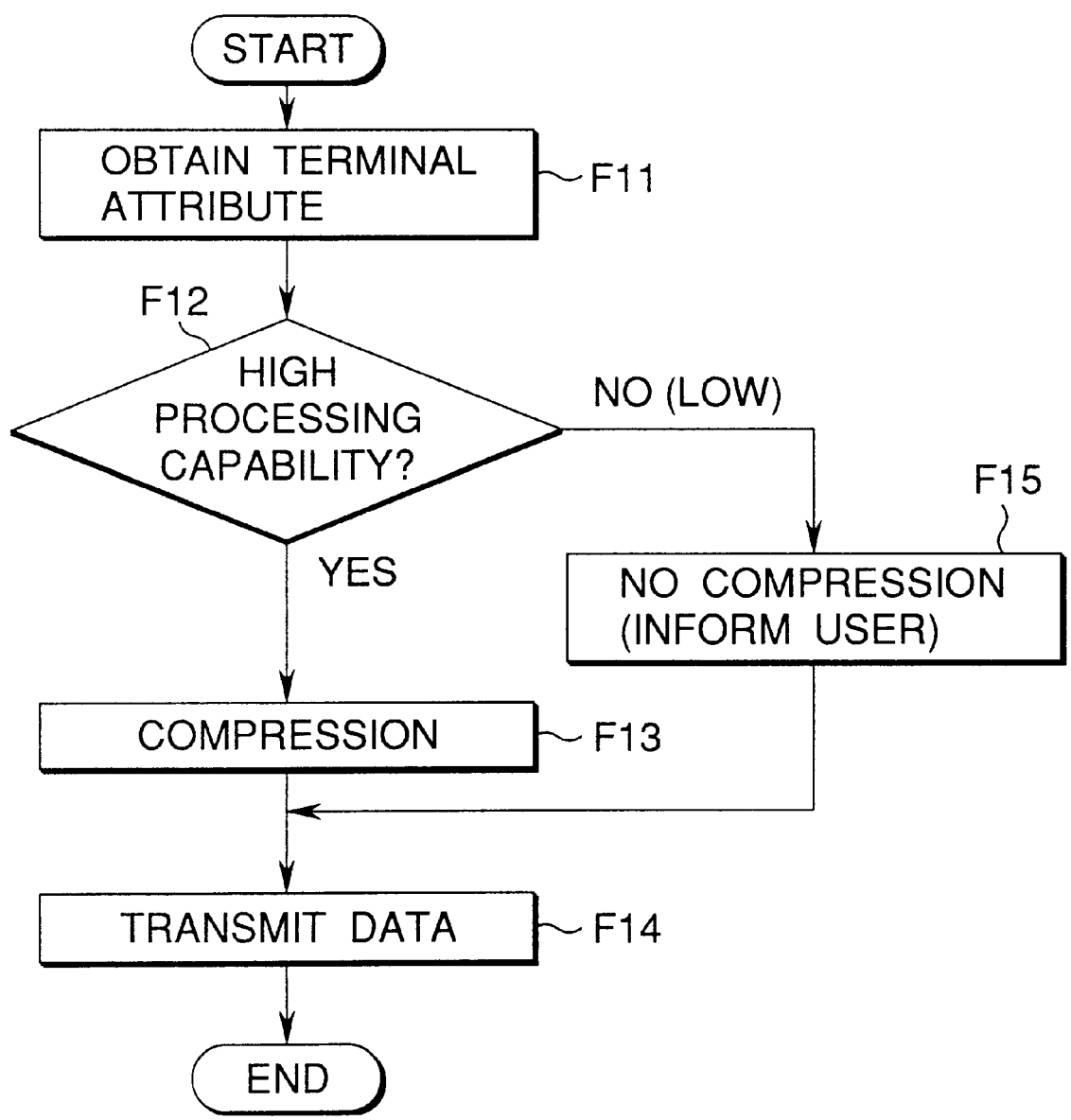
FIG. 13 is a flow chart showing a data compression processing operation.

The processing operation at this time is shown in FIG. 13.

FIG. 13 is a flow chart showing the data compression processing operation. In providing the application service by the application service section 20, the data exchange unit 10 obtains the attribute data of a terminal as a communication partner from the terminal data management section 12 (step F11), and determines the processing capability of the terminal on the basis of the attribute data (step F12).

If it is determined that the terminal has a high processing capability and a capability of expanding the compressed data (Yes in step F12), the data exchange unit 10 compresses the application service data by the data exchange process section 11 (step F13), and transmits the compressed service data to the terminal (step F14). The terminal expands the compressed data and then uses the service.

If the terminal has a low processing capability and no capability of expanding the compressed data (No in step F12), the data exchange unit 10 directly transmits the application service data (step F14) without compressing the data (step F15). At this time, the user may be informed of a message representing that no compression is performed.

With the data compression function, data transmission can be efficiently performed. In this case, compression can be appropriately performed by determining the type of available data compression on the basis of the terminal attribute.

In the example shown in FIG. 13, it is determined whether data compression is enabled only on the basis of the processing capability of the terminal. However, whether data compression is enabled may be determined on the basis of not only the processing capability of the terminal but also the communication capability of the communication network connected to the terminal.

The level of compression can be appropriately changed in correspondence with the processing capability of the terminal or the communication capability of the communication infrastructure.

Utilization of the application service using an I/O unit will be described next.

I/O units mean units other than a computer and correspond to the handy phone 32, the pager 33, the FAX 34, the printer 42, and the image reader 43 in the example shown in FIG. 1.

Figure 14:
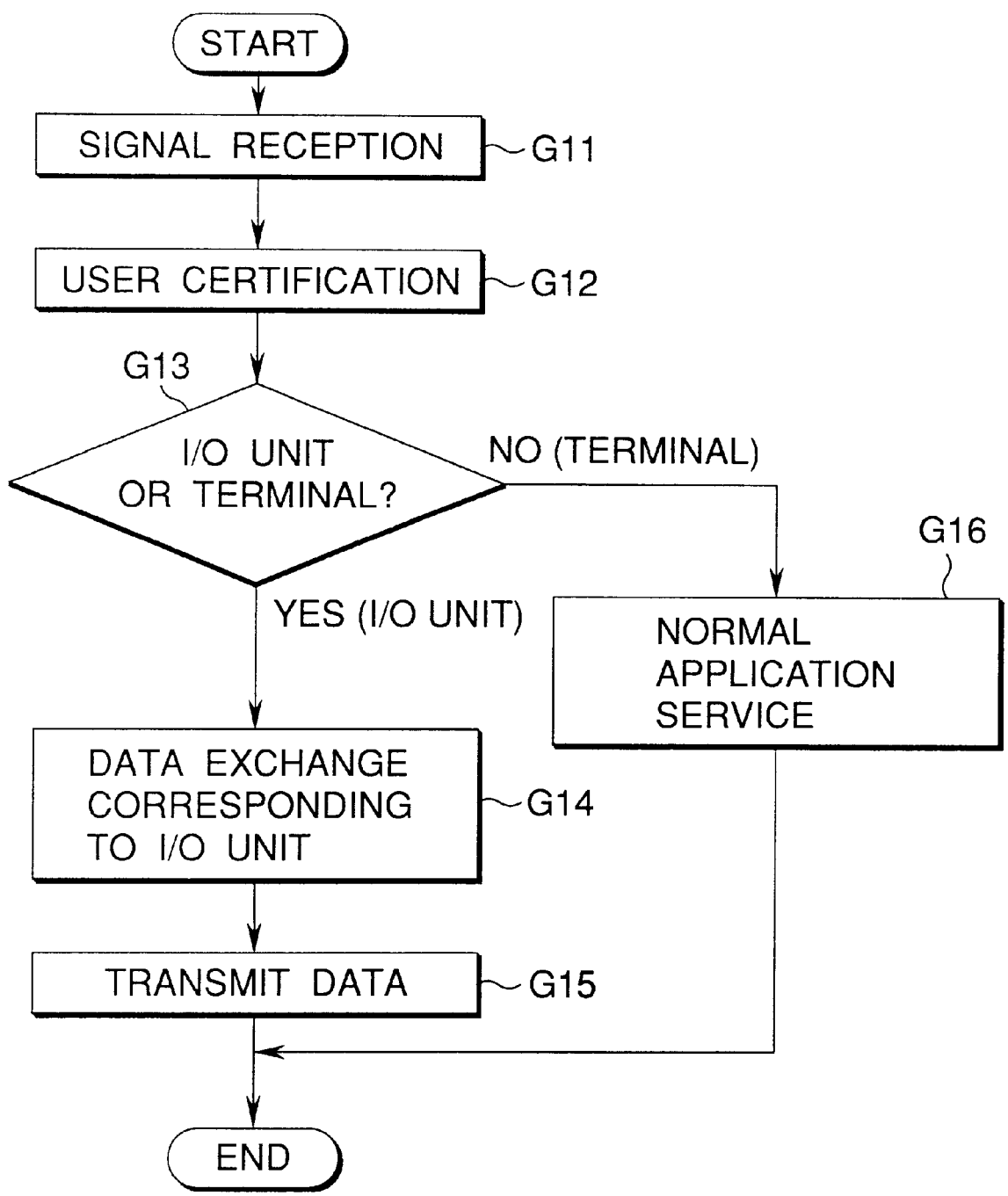
FIG. 14 is a flow chart showing a processing operation in utilization of the application service using an I/O unit.

FIG. 14 is a flow chart showing a processing operation in utilization of the application service using an I/O unit. Upon receiving a signal representing utilization of the application service from the user (step G11), the data exchange unit 10 certifies the user through the user data management section 14 (step G12), and determines the type of unit of the user (step G13).

If the user is using an I/O unit (Yes in step G13), the data exchange unit 10 performs the data exchange process corresponding to the I/O unit (step G14), and transmits the converted service data (step G15).

More specifically, when the I/O unit is the handy phone 32, the data exchange unit 10 converts, e.g., text data into speech data using the speech processing function, and provides the service as a voice message.

For the pager 33, text data is converted into message data corresponding to a predetermined number of characters and transmitted. For the FAX 34, text data is converted into image data and transmitted. In this way, the service is provided within the specific limitation corresponding to each I/O unit.

If the unit of the user is not an I/O unit but a terminal having a CPU capability (No in step G13), the data exchange unit 10 executes a normal application service (step G16). That is, the data exchange unit 10 performs the data exchange process corresponding to the processing capability of each terminal and provides the service.

With the data exchange process corresponding to the I/O unit, even when the user uses a FAX or the like, the application service can be provided in correspondence with the FAX.

The service data from the server can also be subjected to the data exchange process corresponding to both the attribute of the I/O unit and the attribute of the communication infrastructure.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

Figure 15:
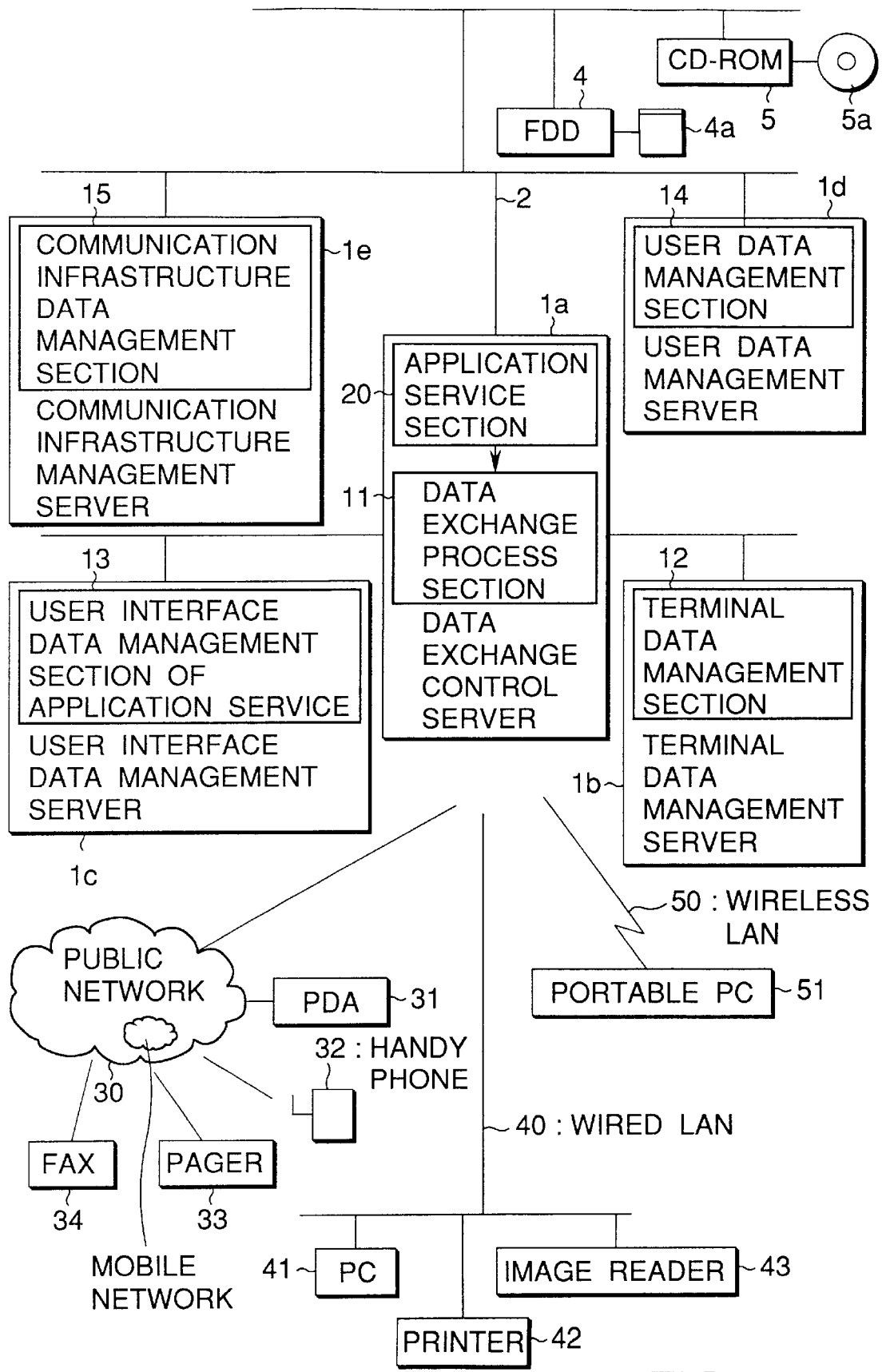
FIG. 15 is a block diagram showing the structure of a distributed network computing system according to the second embodiment of the present invention.

FIG. 15 is a block diagram showing the structure of a distributed network computing system according to the second embodiment of the present invention. The same reference numerals as in FIG. 1 denote the same parts in FIG. 15, and a detailed description thereof will be omitted.

FIG. 15 is different from FIG. 1 in that a plurality of servers 1a to 1e exist on a network. In this embodiment, the servers 1a to 1e are connected to each other via a wired LAN 2 in an office.

The server 1a is a main server computer for providing a service and has an application service section 20. The server 1 has a data exchange process section 11 and operates as a data exchange control server for controlling the entire data exchange process.

The servers 1b to 1e are subserver computers. The server 1b has a terminal data management section 12 for managing terminal attribute data and operates as a terminal data management server under the control of the server 1a. The server 1c has a user interface data management section 13 for managing user interface data and operates as a user interface data management server under the control of the server 1a. The server 1d has a user data management section 14 and operates as a user data management server under the control of the server 1a. The server 1e has a communication infrastructure data management section 15 and operates as a communication infrastructure data management server under the control of the server 1a.

These servers 1a to 1e are connected various terminals (e.g., a PDA 31, a personal computer 41, and a portable personal computer 51) through various communication networks (e.g., a public network 30, a wired LAN 40, and a wireless LAN 50).

In the second embodiment, the terminal data management section 12, the user terminal data management section 13, the user data management section 14, and the communication infrastructure data management section 15 are arranged in the servers 1b to 1e, respectively, thereby constituting the distributed processing system. Since the server 1a having the data exchange process section 11 controls various processing operations, an integrated data exchange process function is realized.

A communication interface 111 for inside of data exchange unit shown in FIG. 2 controls communication between the servers. A communication interface 116 for outside of data exchange unit controls communication with the application service or various terminals.

In FIG. 15, functions necessary for the data exchange process are distributed to the servers 1b to 1e. One server may have two or more functions, or a plurality of servers may have the same function.

The operation of the second embodiment will be described below.

Figure 16:
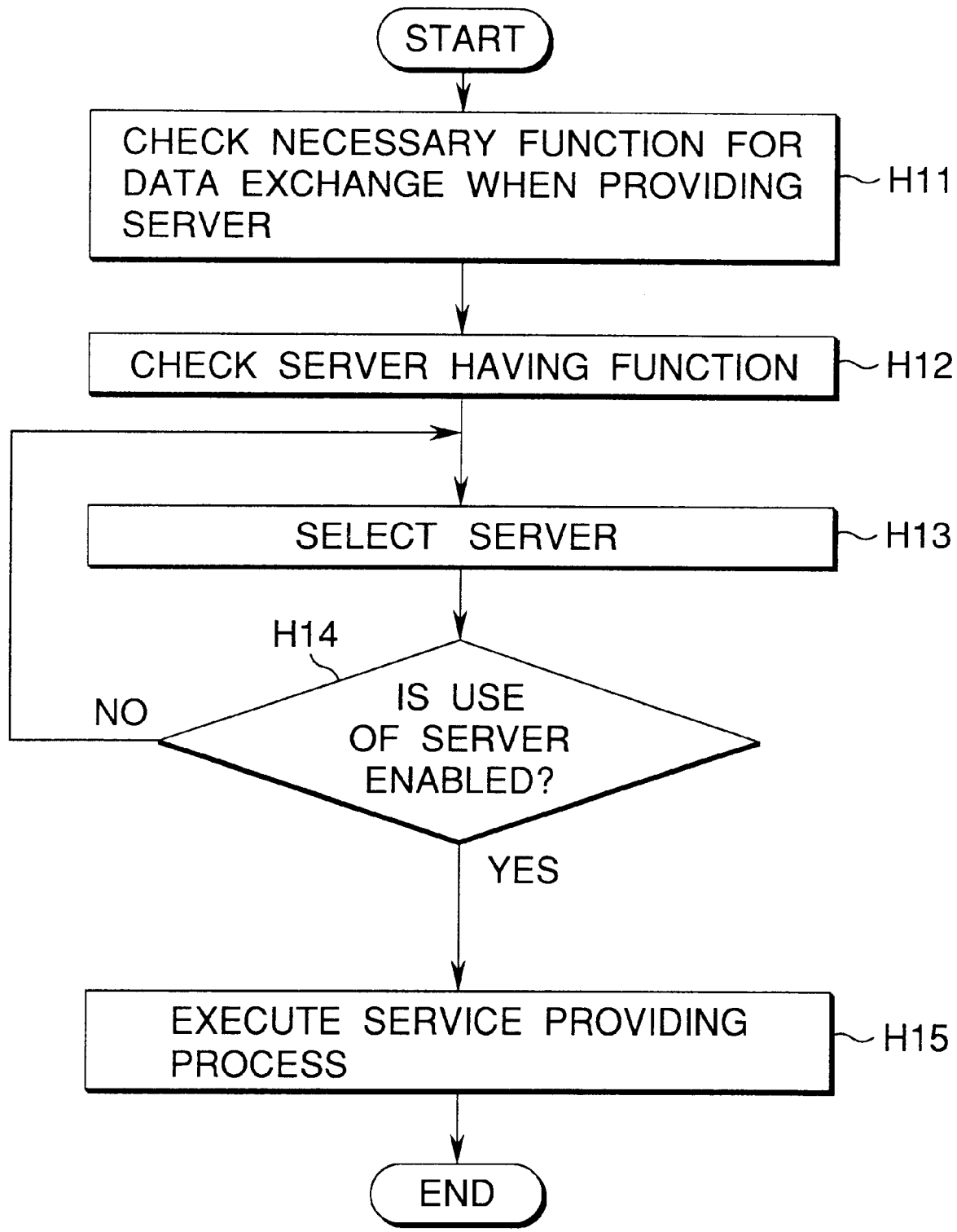
FIG. 16 is a flow chart showing a service providing process operation by distributed processing in the second embodiment shown in FIG. 15.

FIG. 16 is a flow chart showing a service providing process operation by distributed processing in the second embodiment. In providing the application service to a terminal, the server 1a checks the necessary function for the data exchange process first (step H11). In this case, the necessary function for the data exchange process is a function of managing the terminal attribute data or communication infrastructure data or a function of managing user interface data or user data.

When the data exchange process is to be performed in correspondence with the terminal attribute, the terminal attribute data management function is necessary. The server 1a accesses the servers 1b to 1e to check the server having this management function (step H12). In some cases, a plurality of servers have the same function. Therefore, the server 1a confirms each of the corresponding servers and selects a usable server with the desired function (steps H13 and H14).

In the example shown in FIG. 15, the server 1b corresponds to the usable server. In this case, since only the server 1b has the terminal attribute data management function, the server 1a establishes contact with the server 1b and waits for a use permission from the server 1b.

When the use permission is received from the server 1b (Yes in step H14), the server 1a obtains the terminal attribute data of the terminal as a communication partner from the terminal data management section 12 in the server 1b, thereby executing the service providing process by the data exchange process as described in the first embodiment (step H15).

More specifically, the server 1a converts the service data to be provided as an application service into a specific format on the basis of the terminal attribute data by the data exchange process section 11, and transmits the converted service data through the communication network connected to the terminal. In this case, the data exchange process means processing of converting the format of certain data in correspondence with the processing capability of the terminal as the communication partner.

The data exchange process corresponding to the terminal attribute has been described above. When the data exchange process is to be performed in correspondence with the attribute of a communication infrastructure, the servers 1b to 1e are accessed to check the server having the communication infrastructure data management function. The server 1a obtains the communication infrastructure data corresponding to the terminal as the communication partner from the communication infrastructure data management section 15 in the server 1e, thereby executing the service providing process by the data exchange process as described in the first embodiment. In this case, the data exchange process means processing of converting the format of certain data in correspondence with the communication capability of the communication network connected to the terminal as the communication partner.

When the data exchange process is to be performed in correspondence with the attribute of the user interface, the servers 1b to 1e are accessed to check the server having the user interface data management function. The server 1a obtains the user interface data corresponding to the terminal as the communication partner from the user interface data management section 13 in the server 1c, thereby executing the service providing process by the data exchange process as described in the first embodiment. In this case, the data exchange process means processing of converting the format of certain data in correspondence with the operation method (operation method of receiving the application service using an icon, a button, or a command) of the terminal as the communication partner.

When the data exchange process is to be performed in correspondence with the attribute of the user, the servers 1b to 1e are accessed to check the server having the user data management function. The server 1a obtains the user data corresponding to the terminal as the communication partner from the user data management section 14 in the server 1d, thereby executing the service providing process by the data exchange process as described in the first embodiment. In this case, the data exchange process means processing of converting the format of certain data in correspondence with the operation method (operation method of the user's preference for, e.g., screen display) of the user of the terminal as the communication partner.

As described above, even when various functions of the data exchange unit are distributed, the same effect as in the first embodiment can be obtained. By distributing the functions, a plurality of servers each having a relatively low processing capability can be combined to realize an advanced data exchange process function. In this case, since the processing load on the server (server 1a in FIG. 15) for providing the service is reduced, even a compact computer can cope with the processing. In addition, the data exchange process system realized by combining the plurality of servers can more flexibly cope with a system failure than a centralized system.

In the second embodiment, the functions are distributed to the plurality of servers commonly connected to the wired LAN 2 in the office. However, the functions may be distributed to a plurality of servers connected to various communication networks including the public network 30.

In the second embodiment, each server is accessed to find a server with a desired function. However, the present invention is not limited to this, and the corresponding server may be found with reference to a table representing the functions of the respective servers.

The data enciphering function or data compression function may be distributed to other servers. For data enciphering, a server having the data enciphering function determines on the basis of the terminal attribute data or communication infrastructure data whether data enciphering is enabled. If data enciphering is enabled, the service data provided as the application service is enciphered. The server for providing the application service receives the enciphered service data and transmits the data to the terminal as the communication partner.

For data compression, a server having the data compression function determines on the basis of the terminal attribute data or communication infrastructure data whether data compression is enabled. If data compression is enabled, the service data provided as the application service is compressed. The server for providing the application service receives the compressed service data and transmits the data to the terminal as the communication partner.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

The third embodiment of the present invention will be described next.

In the third embodiment, a data exchange apparatus is realized on an exchange system.

Figure 17:
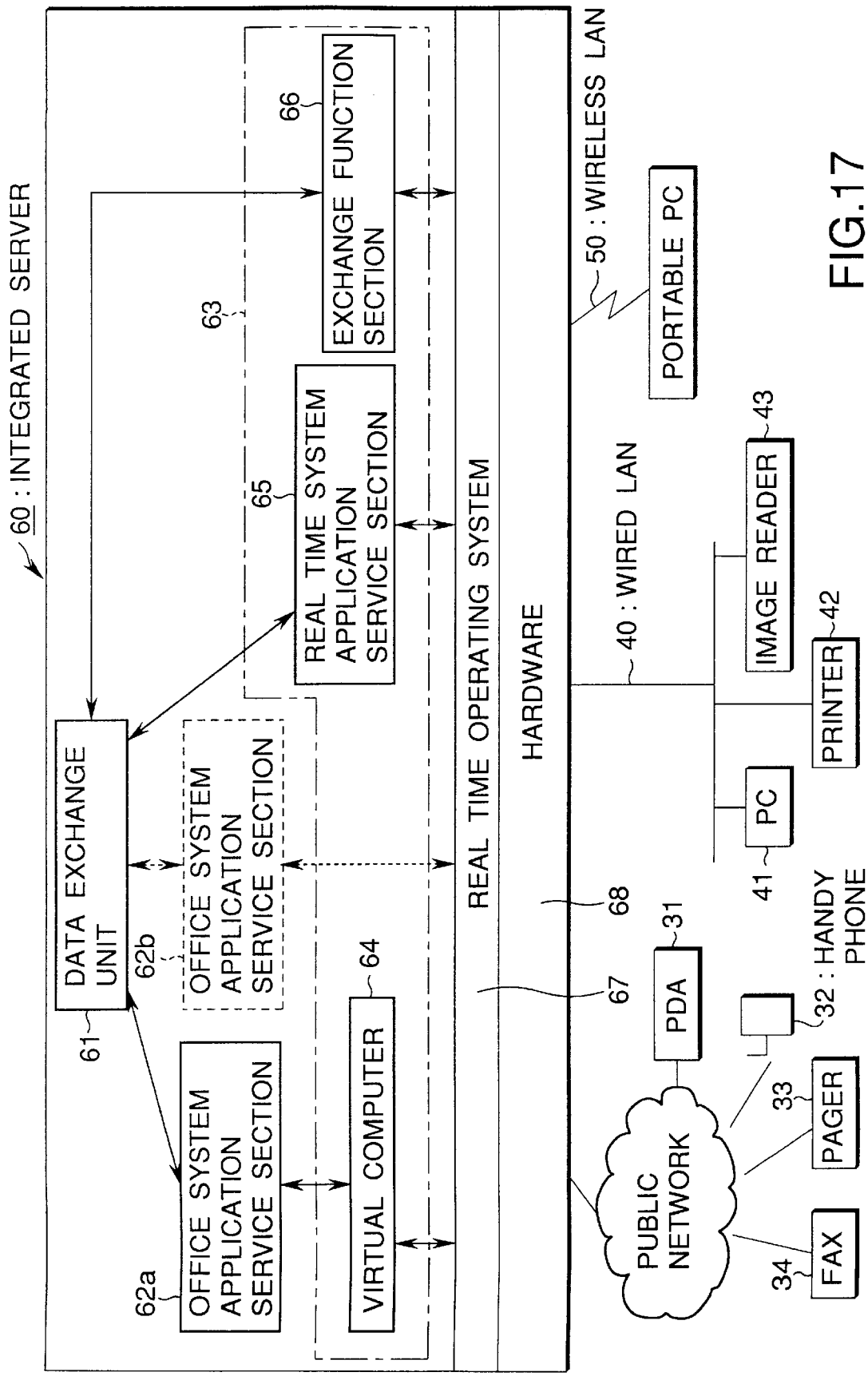
FIG. 17 is a block diagram showing the structure of an integrated server in case wherein a data exchange apparatus according to the third embodiment of the present invention is realized on an exchange system.

FIG. 17 is a block diagram showing the structure of an integrated server 60 when a data exchange apparatus according to the third embodiment is realized on an exchange system. In this embodiment, a unit in which a line exchange system and a server computer are integrated will be referred to as an integrated server.

As shown in FIG. 17, the integrated server 60 has a data exchange unit 61. The data exchange unit 61 performs the data exchange process in correspondence with the attribute of a terminal or a communication infrastructure. The detailed structure of the data exchange unit 61 is the same as that of the data exchange unit 10 shown in FIG. 1, and a detailed description thereof will be omitted.

The integrated server 60 also has an office system application service section 62a as a server computer. The office system application service section 62a performs various office system application services (application software) such as an inventory control service. Currently, since the office system application service section 62a cannot be directly mounted on a real time operating system (to be referred to as a real time OS hereinafter) 67 without modification, a virtual computer 64 is interposed. The real time OS 67 is an OS for a real time processing application and places prominence on the response speed, unlike a general OS (e.g., UNIX or MS-DOS).

An office system application service section 62b which can start on the real time OS 67 can be directly mounted on the real time OS 67 without interposing the virtual computer 64. The virtual computer 64 is a virtually formed computer and has the same function as that of a computer (real computer). One OS can run on one virtual computer. In this embodiment, the virtual computer 64 is incorporated in a line exchange system 63.

Figure 18:
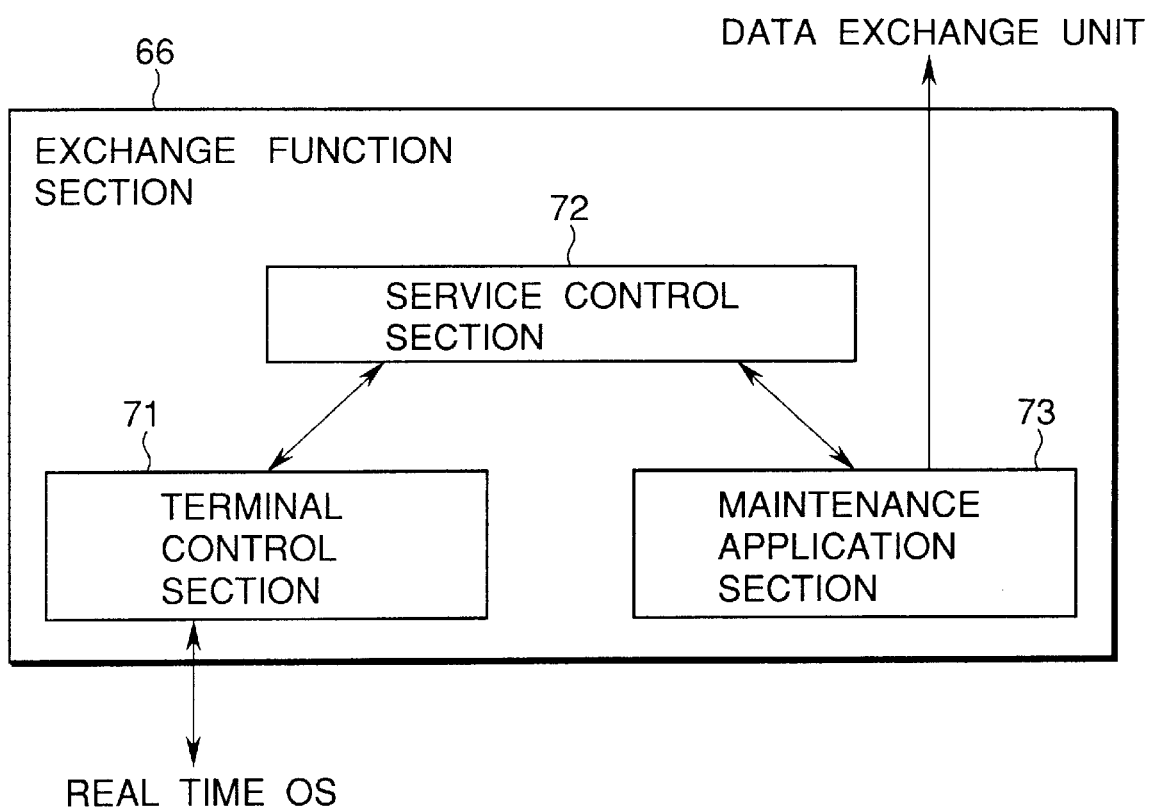
FIG. 18 is a block diagram showing the structure of an exchange function section of a line exchange system in the third embodiment shown in FIG. 17.

The line exchange system 63 is constituted by the virtual computer 64, a real time system application service section 65, and an exchange function section 66. The real time system application service section 65 performs general telephone system services such as delayed delivery (answering service) or message transfer (pager). The exchange function section 66 has the function of an exchange system, e.g., line connection or telephone number management. FIG. 18 shows the structure of the exchange function section 66.

As shown in FIG. 18, the exchange function section 66 is constituted by a terminal control section 71, a service control section 72, and a maintenance application section 73. The terminal control section 71 performs control for receiving a signal from a terminal and transferring the signal to another terminal. The service control section 72 determines a service to be provided in accordance with a signal. The maintenance application section 73 manages not only line error data but also telephone number data.

Hardware 68 represents a physical circuit portion such as a CPU and a line circuit.

With this structure, an apparatus serving as a line exchange system and a data exchange unit on a telephone network can be realized. In this case, by practicing the integrated server, data can be converted into a final format near the user terminal. More specifically, when a network is constituted by subnetworks, data can be converted into a format suitable for the subnetwork.

Data is stored in the end integrated server. Finally, the integrated server is used as a cache. Only simplified data transmission is performed for the terminal as the communication partner, i.e., the terminal is informed of registration of data in the cache. With this processing, the loss in data volume can be minimized, and the characteristics of each subnetwork can be compensated for.

When an exchange function is added, the system can also be used as an office server. In many cases, a number of exchange systems are arranged on the network. For this reason, the distributed processing as described in the second embodiment can be effectively performed.

In the example shown in FIG. 17, the data exchange unit is incorporated in the integrated server in which the server computer and the exchange system are integrated. The present invention is not limited to this. For example, the data exchange unit may be arranged independently of the integrated server (server computer+exchange system), and the application service provided from the integrated server may be converted into a predetermined format by the data exchange unit. Alternatively, various functions of the data exchange unit may be distributed to a plurality of exchange systems. That is, various changes and modifications can be made within the spirit and scope of the present invention.

A case wherein the data exchange unit is arranged in the exchange system will be described below.

Figure 19:
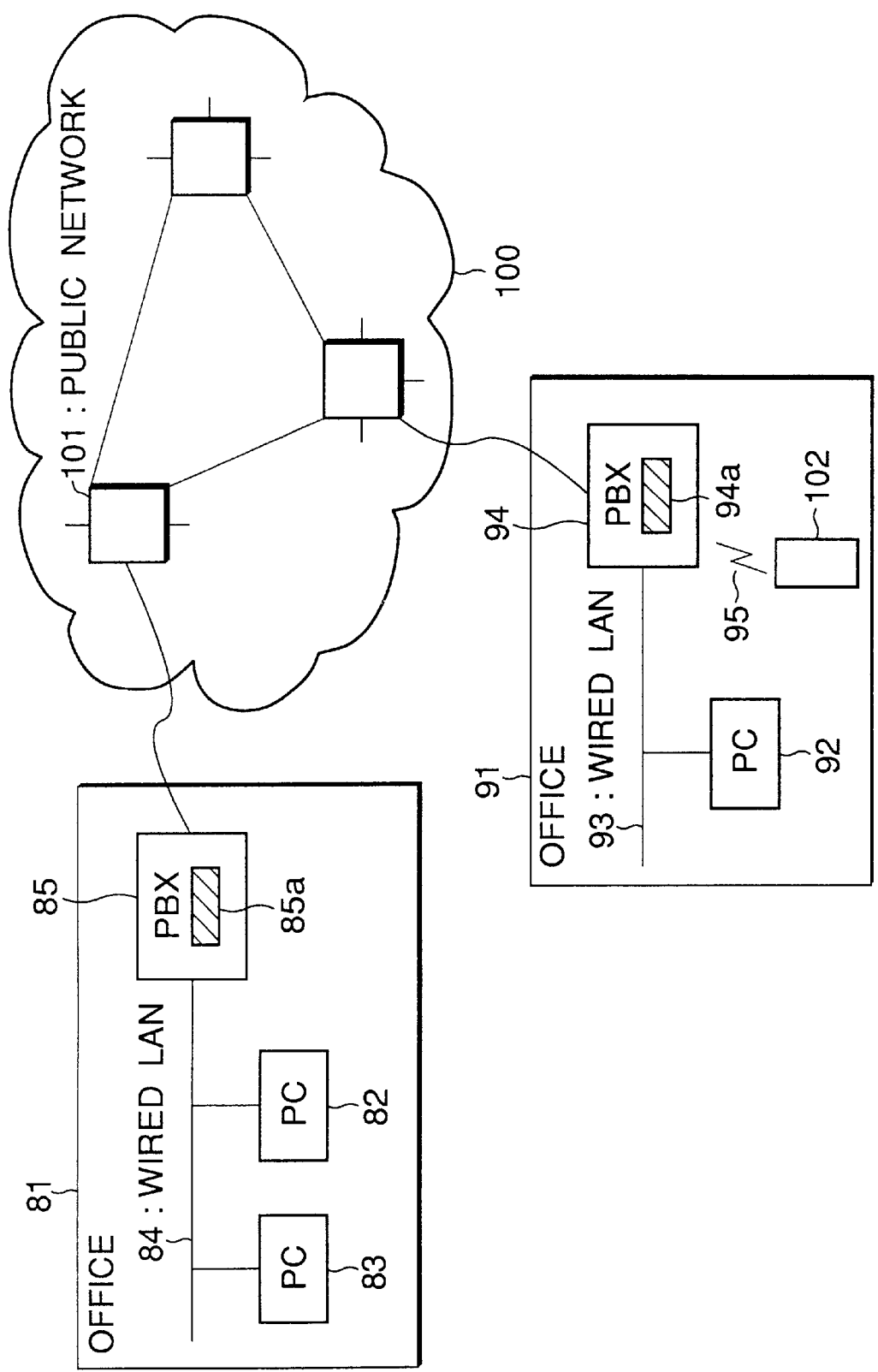
FIG. 19 is a block diagram showing the structure of a distributed network computing system according to the third embodiment of the present invention.

FIG. 19 is a block diagram showing the structure of a distributed network computing system according to the third embodiment. FIGS. 20A and 20B are diagrams explaining a flow of processing of the embodiment shown in FIG. 19. Assume that a personal computer 82, a personal computer 83, and an integrated server 85 connected to the personal computers 82 and 83 via a wired LAN 84 are arranged in an office 81. The integrated server 85 is a computer in which a server computer and a PBX (private branch exchange) are integrated. The integrated server 85 operates as an exchange system and also provides an application service as a server computer. On the other hand, assume that a personal computer 92 and an integrated server 94 connected to the personal computer 92 via a wired LAN 93 are arranged in an office 91. The integrated server 94 is a computer in which a server computer and a PBX (private branch exchange) are integrated, like the integrated server 85.

Reference numeral 100 denotes a public network; 101, a private exchange system 101 present on the public network; and 102, a portable terminal 102 which receives a service. The portable terminal 102 is connected to the integrated server 94 via a private radio system 95 in the office 91.

With this structure, the application service provided from the private radio system 95 in the office 81 can be used at the terminals (the personal computer 82 and the personal computer 83) set in the same office and also be used at the terminals (the personal computer 92 and the portable terminal 102) set in the other office 91.

When a PBX 85a in the integrated server 85 has a data exchange function, the service data provided from the integrated server 85 is sent to the integrated server 94 through the PBX 85a and the public network 100, as shown in FIG. 20A. If, at this time, the user is using the portable terminal 102, the user receives the service data from the integrated server 94 through the private radio system 95. However, when the portable terminal 102 cannot receive the service data because of the excessive data volume, the service data must be converted by the PBX 85a in the integrated server 85 and then retransmitted.

The data exchange function may be distributed to the PBX 85a in the integrated server 85 and a PBX 94a in the integrated server 94. In this case, the PBX 85a determines only the user terminal, and the service data can be directly transmitted to the end integrated server 94, as shown in FIG. 20B. The service data is transmitted to the integrated server 94 through the PBX 85a and the public network 100. The PBX 94a in the integrated server 94 determines the communication infrastructure corresponding to the user terminal. The PBX 94a converts the service data in correspondence with the data transmission capability of the communication infrastructure and transmits the data.

If the service data volume is large, and the user is using the portable terminal 102, the portable terminal 102 is only informed of service providing, and the service data is directly downloaded to the personal computer 92. In this case, when the user directly makes reference to the personal computer 92, or when the portable terminal 102 is connected to the wired LAN 93, the service can be provided without retransmitting the service data from the integrated server 85. That is, the end integrated server connected to the terminal which receives the service can be used as a cache. Consequently, the time can be saved, and the charge for the line can also be saved.

As described above, when the line exchange system has a data exchange function, the data can be converted into a final format near the user terminal. More specifically, when a network is constituted by subnetworks, the data can be converted into a format suitable for the subnetwork.

In the third embodiment, the line exchange system has been described. The present invention is not limited to this, and a router for connecting LANs to each other may be used. In a network connection apparatus for connecting networks (public networks for a line exchange system, and LANs for a router) to each other, the same effect as described above can be obtained by mounting the data exchange unit in the network connection apparatus. In the above embodiment, the terminal which receives the service may operate as a server computer.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

The fourth embodiment of the present invention will be described below.

Figure 21:
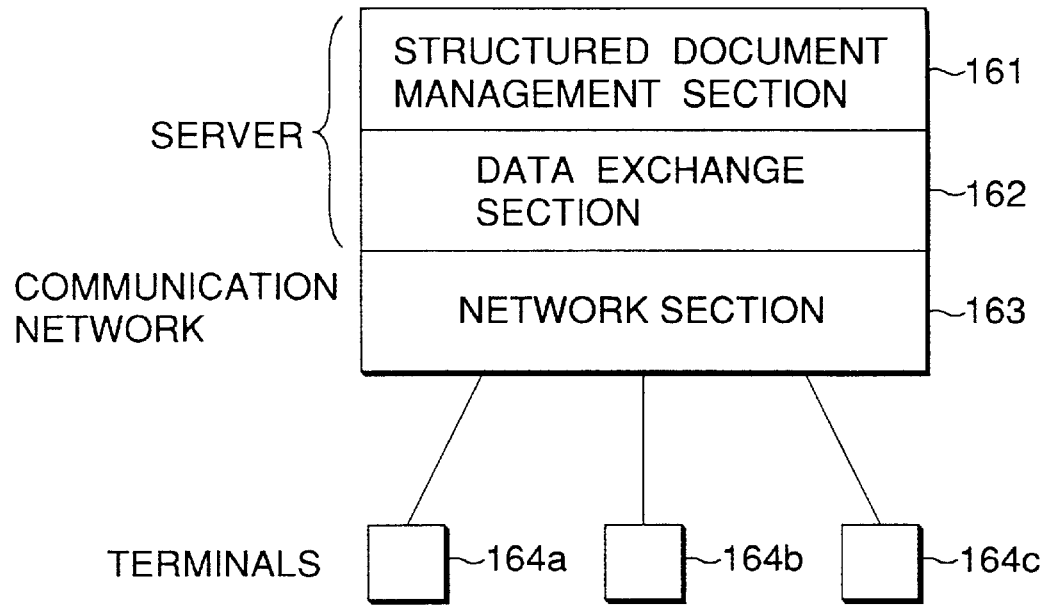
FIG. 21 is a view showing the concept of an entire system including an application service on the assumption of a structured document.
Figure 26:
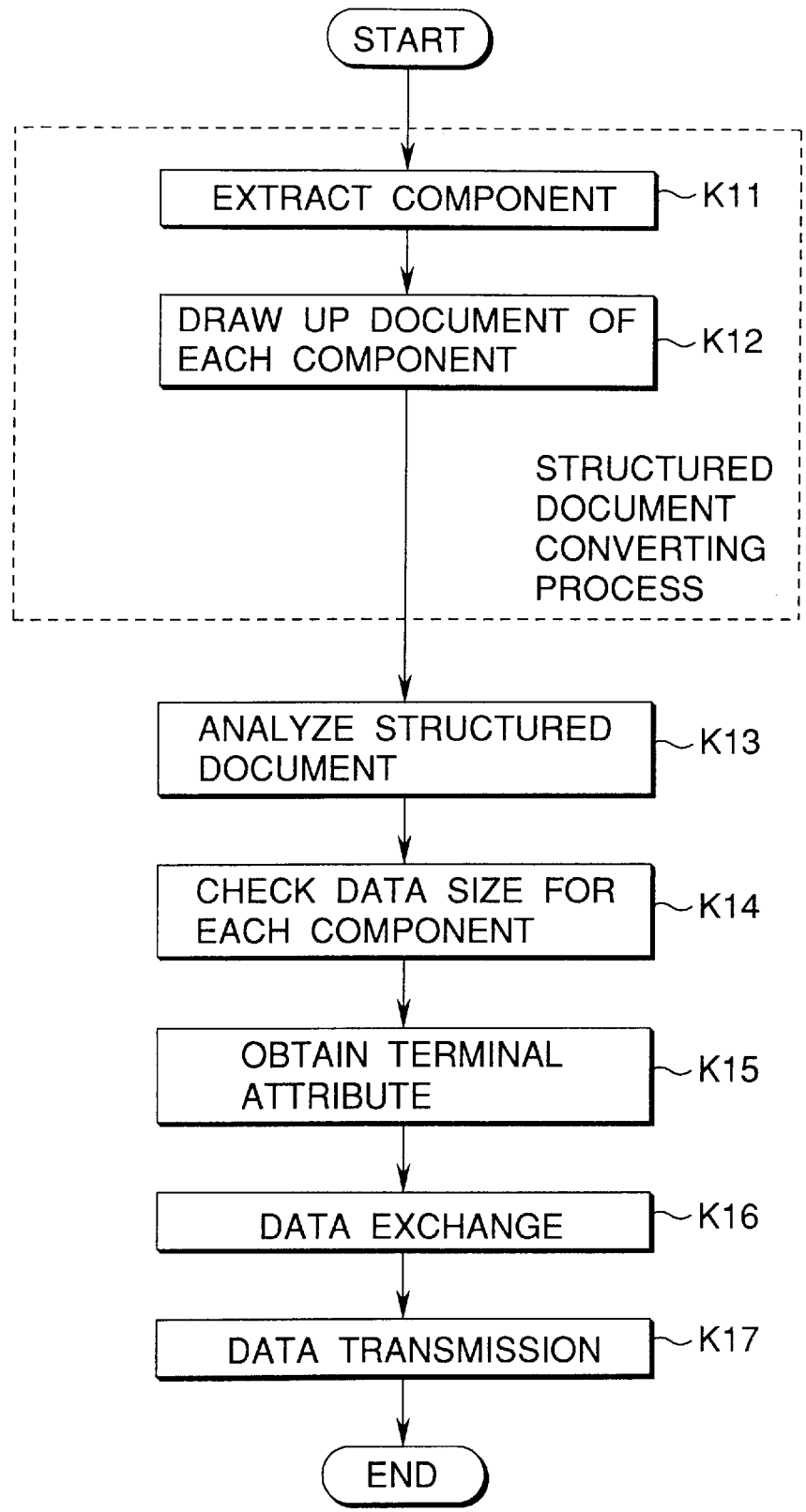
FIG. 26 is a flow chart showing a processing operation for service data other than the structured document format.

FIG. 21 is a view showing the concept of an entire system including an application service on the assumption of a structured document. Referring to FIG. 21, reference numeral 161 denotes a structured document management section for managing service data provided as an application service of various application software in a structured document format. The structured document management section 161 is arranged in an application service section 20 shown in FIG. 1. In this embodiment, the application service section 20 manages service data which has been described in the structured document format in advance. However, the service data may be described in a nonstructured document format (FIG. 26).

Reference numeral 162 denotes a data exchange section for performing the data exchange process corresponding to a terminal attribute or a communication infrastructure attribute. The data exchange section 162 corresponds to a data exchange unit 10 shown in FIG. 1. Reference numeral 163 denotes a network section corresponding to various communication networks for connecting the server and terminals. The network section 163 corresponds to the public network 30, the wired LAN 40, and the wireless LAN 50 shown in FIG. 1. Reference numerals 164a to 164c denote terminals which receive the service from the server and correspond to, e.g., a personal computer, an NC (Network Computer), or a PDA (Personal Digital Assistants). The terminals 164a to 164c are connected to different communication infrastructures and have different processing capabilities. The terminals 164a to 164c correspond to the PDA 31, the personal computer 41, or the portable personal computer 51 shown in FIG. 1.

Figure 22:
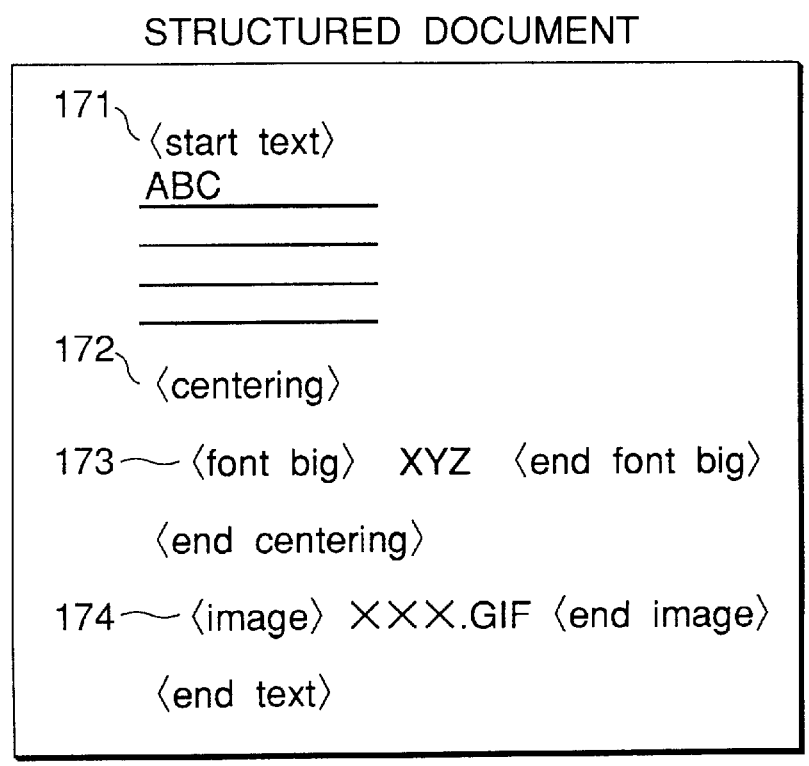
FIG. 22 is a view showing an example of the structured document shown in FIG. 21.
Figure 27:
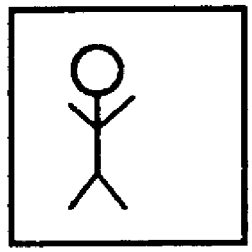
FIG. 27 is a view showing an example an actual display of the structured document shown in FIG. 26.

With this structure, the application services of various application software are managed in the structured document format (e.g., an HTML document) by the structured document management section 161. FIG. 22 shows an example of the structured document for displaying a display as shown in FIG. 27.

Referring to FIG. 22, a tag 171 indicates that text data follows. A tag 172 represents document format data, and in this case, defines centering. A tag 173 represents font data, and in this case, defines a large font. A tag 174 indicates image data (a file name of a file in which image data is stored).

The data exchange section 162 analyzes this structured document and checks the types and data sizes of components constituting the document on the basis of the tag data inserted into the document. In transmitting each component data, the data exchange section 162 checks the processing capability of the terminal or the communication capability of the communication infrastructure and performs the data exchange process in correspondence with the capability.

If it is determined that the data transmission capability of the communication infrastructure is low, the transmission data volume is reduced by performing the data exchange process (or data compression) for a document component in a large data volume. If it is determined on the basis of the terminal attribute that the terminal as a communication partner has no document display capability (for a terminal without any browser), the data is converted into a format that the terminal can be displayed and transmitted.

In the data exchange process, the data is converted such that the document is displayed in correspondence with the user's preference (data exchange process based on user data).

The processing operation will be described next in detail.

An operation performed when service data in the structured document format is managed by the application service section 20 will be described below. An operation performed when the application service section 20 manages service data in the nonstructured document format will be described later with reference to FIG. 26.

Processing corresponding to the terminal attribute will be described first.

Figure 23:
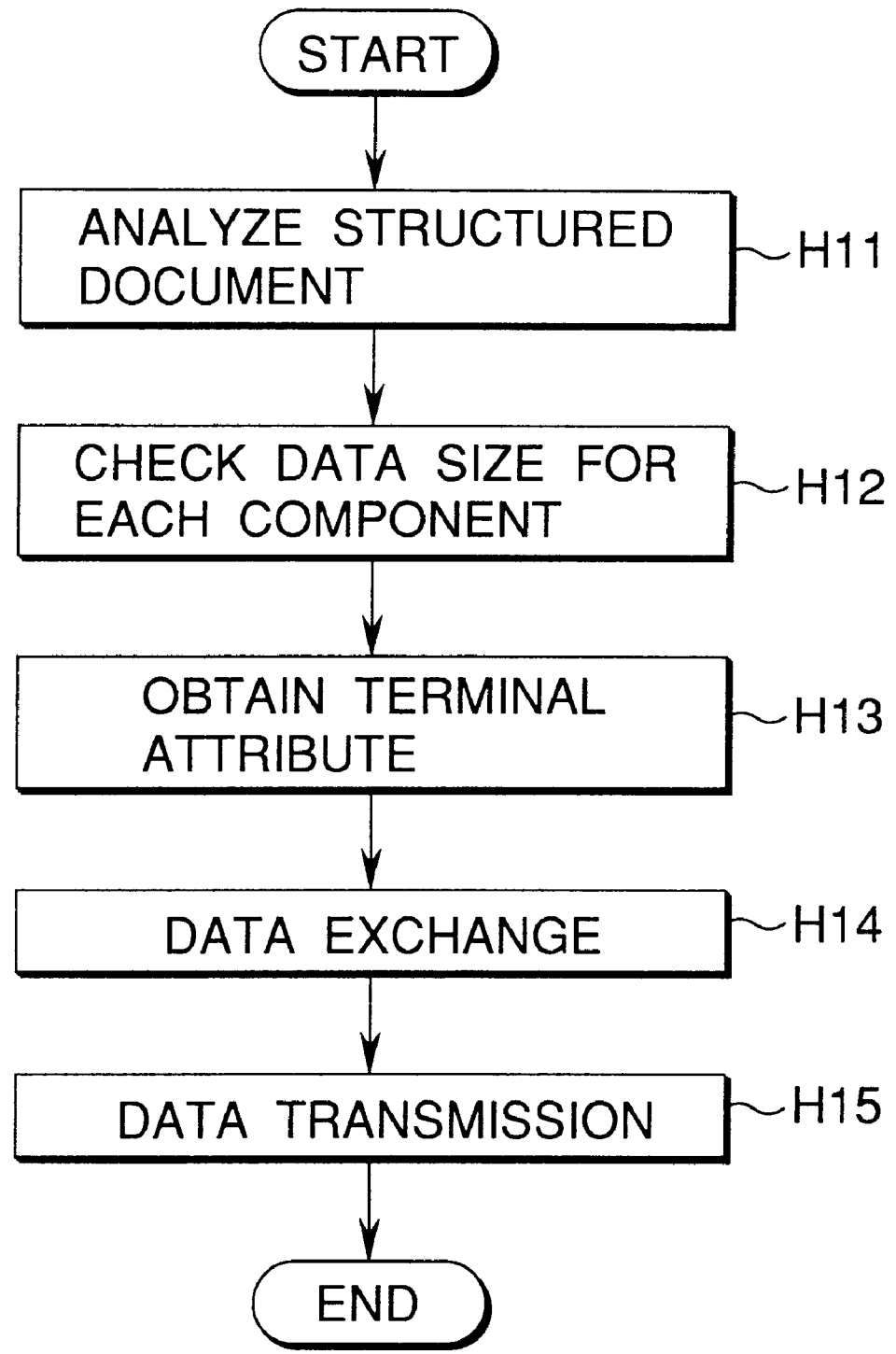
FIG. 23 is a flow chart showing a processing operation corresponding to a terminal attribute in use of the structured document.

FIG. 23 is a flow chart showing a processing operation corresponding to a terminal attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step H11). In this case, each component of the structured document is defined by a syntax represented by tag data. The data exchange unit 10 checks the types and data sizes of the components constituting the document on the basis of the tag data (step H12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the terminal as the communication partner from a terminal data management section 12 and checks the processing capability (step H13). If it is determined that the terminal has a low processing capability and no capability of displaying the structured document, the data exchange unit 10 converts each component data of the structured document into a format that the terminal can display (step H14).

More specifically, for a terminal having a low image control function (terminal without any browser function), image data and, more particularly, moving image data provided as the service data is converted into symbol data (image data which is simplified by some technique) and sent. Document format data is converted into a blank character or a line feed code. A character type is neglected because the terminal cannot handle it. A program such as "Java" or "ActiveX" running on the client (terminal) side is neglected because the terminal cannot handle it. At this time, the user is informed of a message representing that the program cannot be handled.

In this manner, the data exchange process corresponding to the processing capability of the terminal is performed. The data exchange unit 10 transmits the converted service data through a communication network connected to the terminal (step H15). With this processing, even when a terminal without the capability of displaying the structured document is used, the service data can be converted into a format suitable for the terminal and provided.

Processing corresponding to the communication infrastructure attribute will be described below.

For the data exchange process corresponding to the communication infrastructure attribute, only the data size of each component is important.

Figure 24:
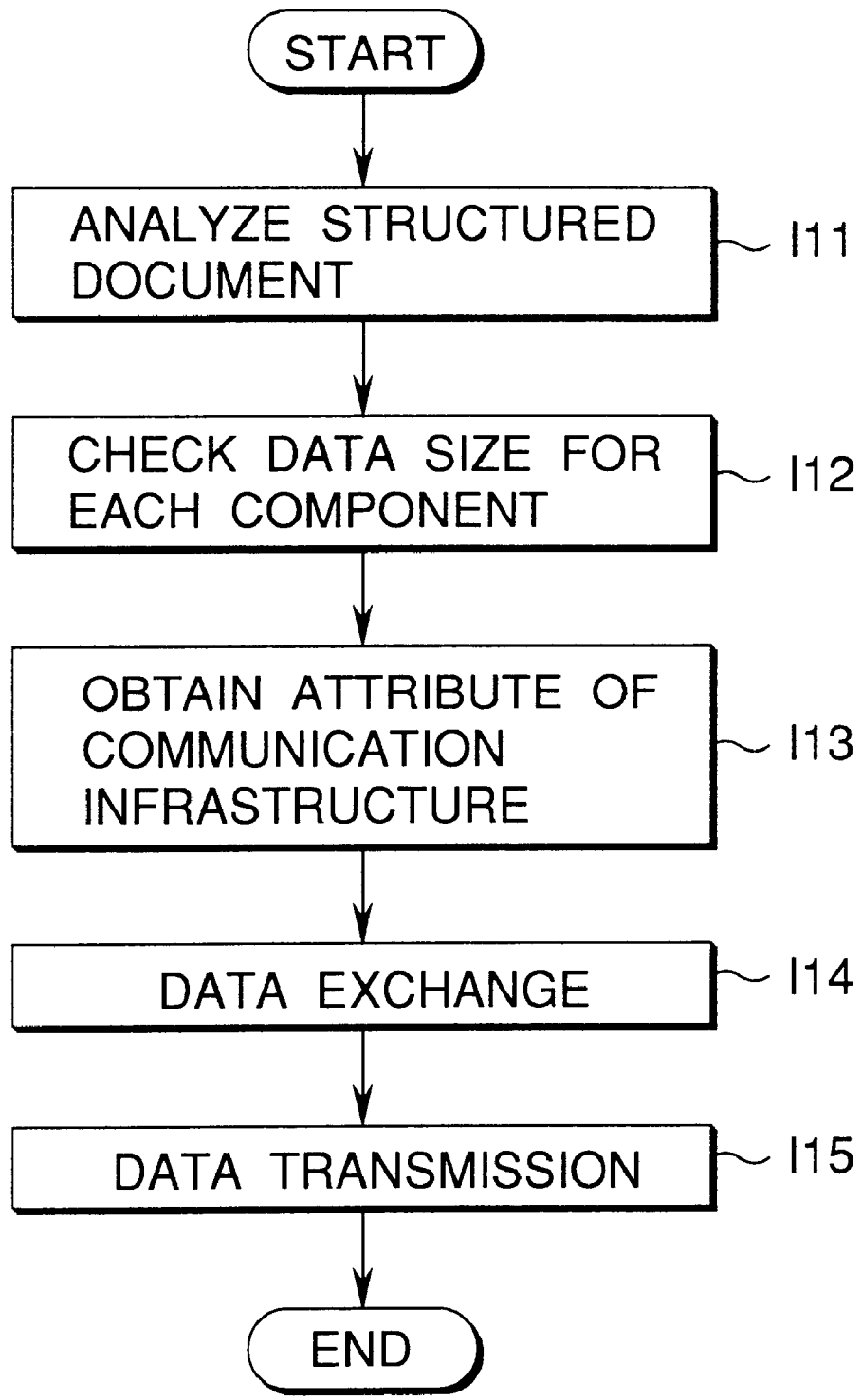
FIG. 24 is a flow chart showing a processing operation corresponding to a communication infrastructure attribute in use of the structured document.

FIG. 24 is a flow chart showing a processing operation corresponding to a communication infrastructure attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step I11). In this case, each component of the structured document is defined by a syntax represented by tag data. The data exchange unit 10 checks the types and data sizes of the components constituting the document on the basis of the tag data (step I12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the communication infrastructure connected to the terminal as the communication partner from a communication infrastructure data management section 15 and checks the communication capability (step I13). If it is determined that the communication infrastructure has a low data transmission capability, the data exchange unit 10 converts each component data of the structured document into a format corresponding to the data transmission capability of the communication infrastructure (step I14).

More specifically, for a communication infrastructure such as a PHS (Personal Handyphone System) data communication network having a low data transmission capability, image data and, more particularly, moving image data provided as the service data is converted to reduce the data volume by time-lapse reproduction or the like and sent.

In this manner, the data exchange process corresponding to the data transmission capability of the communication infrastructure is performed. The data exchange unit 10 transmits the converted service data through the communication network connected to the terminal (step I15). With this processing, even when a communication infrastructure with a low data transmission capability is used, the service data can be converted into a format suitable for the communication infrastructure and provided.

Processing corresponding to the terminal attribute and the communication infrastructure attribute will be described next.

Figure 25:
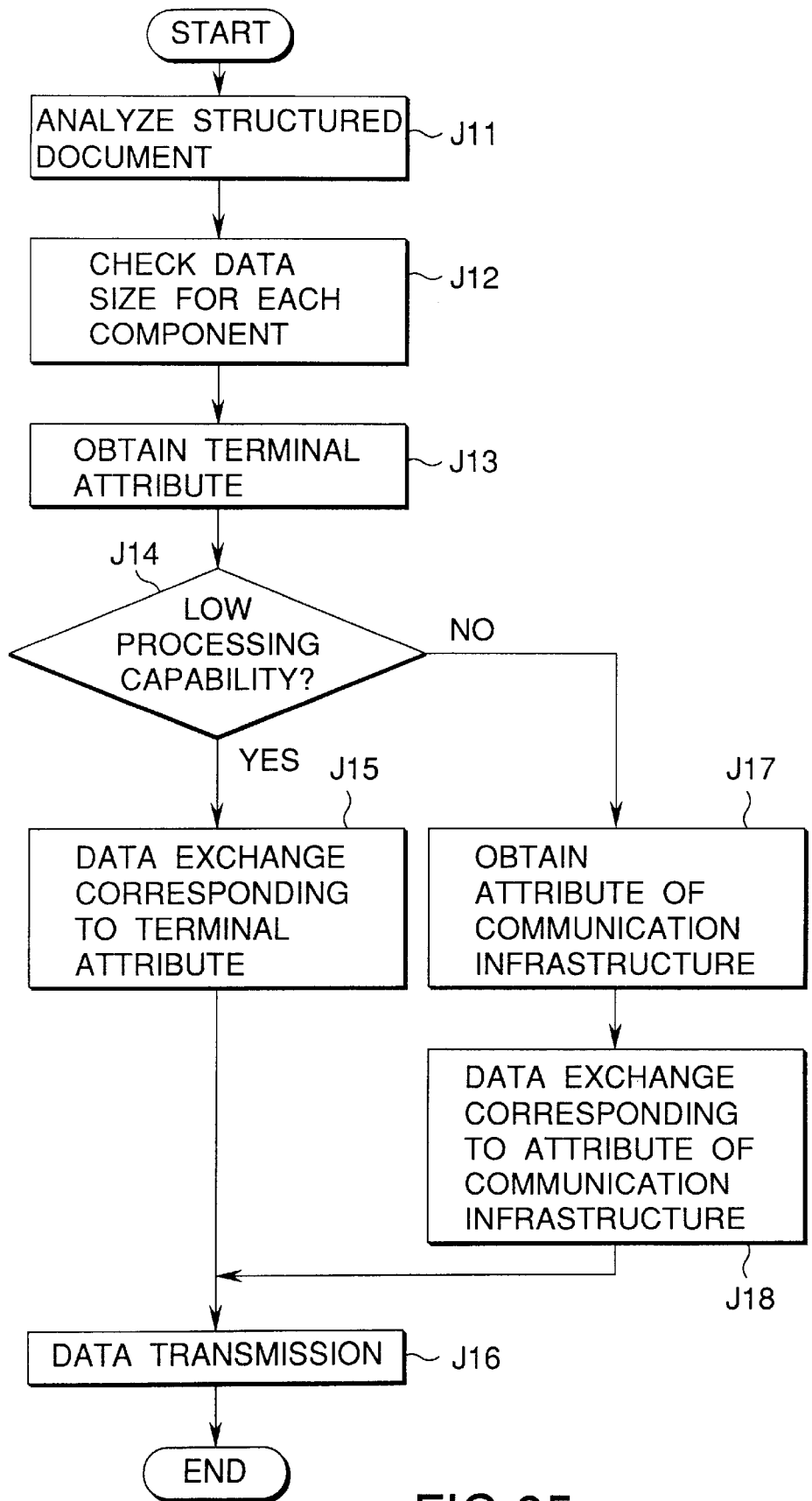
FIG. 25 is a flow chart showing a processing operation corresponding to the terminal attribute and the communication infrastructure attribute in use of the structured document.

FIG. 25 is a flow chart showing a processing operation corresponding to the terminal attribute and the communication infrastructure attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step J11). In this case, each component of the structured document is defined by a syntax represented by tag data. The data exchange unit 10 checks the types and data sizes of the components constituting the document on the basis of the tag data (step J12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the terminal as the communication partner from the terminal data management section 12 and checks the processing capability (step J13). If it is determined that the terminal has a low processing capability and no capability of displaying the structured document (Yes in step J14), the data exchange unit 10 converts each component data of the structured document into a format that the terminal can display (step J15) and transmits the converted service data through the communication network connected to the terminal (step J16).

If it is determined that the terminal has a high processing capability and the capability of displaying the structured document (No in step J14), the data exchange unit 10 obtains the attribute data of the communication infrastructure connected to the terminal as the communication partner from the communication infrastructure data management section 15 (step J17). The data exchange unit 10 performs the data exchange process corresponding to the communication capability of the communication infrastructure on the basis of the attribute data (step J18) and transmits the converted service data through the communication network connected to the terminal (step J16).

As described above, even when service data described in the structured document format is to be provided, the service can be converted in correspondence with the terminal attribute or communication infrastructure attribute, so that the service can be provided in correspondence with the processing capability of the terminal or the communication capability of the communication infrastructure.

Instead of referring to the terminal attribute or communication infrastructure attribute, a user interface data management section 13 shown in FIG. 1 can be used to perform the data exchange process based on user interface data representing the operation method unique to the terminal. Alternatively, a user data management section 14 can be used to perform the data exchange process based on user data representing the operation method unique to the user.

Furthermore, data enciphering or data compression can be performed. When an I/O unit such as a FAX is used, the data exchange process corresponding to the I/O unit can be performed. That is, all of the above-described methods can be applied to provide service data described in the structured document format.

In the above description, service data which has been described in the structured document in advance is provided. The present invention is not limited to this. This technique can also be applied to service data described in a format (binary data) different from the structured document format. The processing operation at this time is shown in FIG. 26.

FIG. 26 is a flow chart showing a processing operation for service data other than the structured document format. A data exchange process corresponding to the terminal attribute will be described below. This description also applies to the data exchange process based on the communication infrastructure attribute, user interface data, or user data.

This processing is different from that in FIG. 23 in that structured document converting process in steps K11 and K12 is added. In this processing, data in, e.g., a binary format is converted into a structured document format such as HTML. This structured document converting process is also performed by the data exchange executing section 113 (FIG. 2) in the data exchange process section 11. In this case, the application service section 20 in the server 1 shown in FIG. 1 manages service data described in a non-structured document format, and this service data is converted into a structured document format.

When a document request instruction (service request instruction) is output from a terminal to the server 1, the service data described in the format different from the structured document format is transferred from the application service section 20 to the data exchange unit 10. The data exchange unit 10 executes the data exchange process to be described below.

The data exchange unit 10 extracts components constituting the service data (step K11). For binary document data, the text, font, format, and other attributes (e.g., date and writer name) are managed with tokens. Therefore, each component can be extracted by checking the token. After extraction of the components, the data exchange unit 10 prepares a structured document in which the components are expressed in a structuring language such as HTML (step K12).

After preparation of the structured document, the structured document is subjected to processing described in FIG. 23.

The data exchange unit 10 analyzes the structured document (step K13) and checks the types and data sizes of the components constituting the document (step K14). The data exchange unit 10 obtains the attribute data of the terminal as the communication partner from the terminal data management section 12 (step K15) and converts each component data on the basis of the attribute data (step K16). The data exchange unit 10 transmits the converted service data through the communication network connected to the terminal (step K17).

As described above, even the service data described in the nonstructured document format can be converted into the structured document format, and the same effect as described above can be obtained.

In the above description, a structured document such as HTML has been exemplified. However, the present invention can be applied to any document constituted by component data, including OLE (Object Linking and Embedding).

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A distributed network computing system including
   a data processing unit for providing an application service of various application software,
   a terminal for receiving the application service from said data processing unit, and
   a communication network which connects said data processing unit and said terminal, comprising:
   a data exchange unit arranged in said data processing unit,
   said data exchange unit comprising
   terminal attribute data management means for managing terminal attribute data representing a processing capability of said terminal,
   conversion means for acquiring the terminal attribute data of said terminal as a communication partner from said terminal attribute data management means and converting service data provided as the application service into a specific format on the basis of the terminal attribute data, and
   communication means for transmitting through said communication network the service data converted by said conversion means.

2. A system according to claim 1, wherein said data exchange unit comprises
   enciphering determination means for determining on the basis of the terminal attribute data whether data enciphering is enabled, and
   enciphering means for enciphering the service data provided as the application service when said enciphering determination means determines that data enciphering is enabled.

3. A system according to claim 2, wherein said enciphering means changes an enciphering level in correspondence with the processing capability of said terminal.

4. A system according to claim 1, wherein said data exchange unit comprises
   compression determination means for determining on the basis of the terminal attribute data whether data compression is enabled, and
   compression means for compressing the service data provided as the application service when said compression determination means determines that data compression is enabled.

5. A system according to claim 4, wherein said compression means changes a compression level in correspondence with the processing capability of said terminal.

6. A distributed network computing system including a data processing unit for providing an application service of various application software, a terminal for receiving the application service from said data processing unit, and a communication network which connects said data processing unit and said terminal, comprising:

a data exchange unit arranged in said data processing unit, said data exchange unit comprising communication infrastructure data management means for managing communication infrastructure data representing a communication capability of said communication network, conversion means for acquiring the communication infrastructure data of said communication network connected to said terminal as a communication partner from said communication infrastructure data management means and converting service data provided as the application service into a specific format on the basis of the communication infrastructure data, and communication means for transmitting through said communication network the service data converted by said conversion means.

7. A system according to claim 6, wherein said data exchange unit comprises enciphering determination means for determining on the basis of the communication infrastructure data whether data enciphering is enabled, and enciphering means for enciphering the service data provided as the application service when said enciphering determination means determines that data enciphering is enabled.

8. A system according to claim 7, wherein said enciphering means changes an enciphering level in correspondence with the communication capability of said communication network.

9. A system according to claim 6, wherein said data exchange unit comprises compression determination means for determining on the basis of the communication infrastructure data whether data compression is enabled, and compression means for compressing the service data provided as the application service when said compression determination means determines that data compression is enabled.

10. A system according to claim 9, wherein said compression means changes a compression level in correspondence with the communication capability of said communication network.

11. A distributed network computing system including a data processing unit for providing an application service of various application software, a terminal for receiving the application service from said data processing unit, and a communication network which connects said data processing unit and said terminal, comprising:

a data exchange unit arranged in said data processing unit, said data exchange unit comprising terminal attribute data management means for managing terminal attribute data representing a processing capability of said terminal, communication infrastructure data management means for managing communication infrastructure data representing a communication capability of said communication network, conversion means for acquiring the terminal attribute data of said terminal as a communication partner from said terminal attribute data management means and simultaneously acquiring the communication infrastructure data of said communication network connected to said terminal from said communication infrastructure data management means, and converting service data provided as the application service into a specific format on the basis of the terminal attribute data and the communication infrastructure data, and communication means for transmitting through said communication network the service data converted by said conversion means.

12. A system according to claim 11, wherein said data exchange unit comprises enciphering determination means for determining on the basis of the terminal attribute data and the communication infrastructure data whether data enciphering is enabled, and enciphering means for enciphering the service data provided as the application service when said enciphering determination means determines that data enciphering is enabled.

13. A system according to claim 12, wherein said enciphering means changes an enciphering level in correspondence with the processing capability of said terminal and the communication capability of said communication network.

14. A system according to claim 11, wherein said data exchange unit comprises compression determination means for determining on the basis of the terminal attribute data and the communication infrastructure data whether data compression is enabled, and compression means for compressing the service data provided as the application service when said compression determination means determines that data compression is enabled.

15. A system according to claim 14, wherein said compression means changes a compression level in correspondence with the processing capability of said terminal and the communication capability of said communication network.

16. A system according to any one of claims 1, 6, and 11, wherein said terminal comprises a plurality of terminals present on a network.

17. A system according to any one of claims 1, 6, and 11, wherein said communication network comprises a plurality of communication networks present on a network.

18. A system according to any one of claims 1, 6, and 11, wherein said terminal and said communication network respectively comprise a plurality of terminals and a plurality of communication networks present on a network.

19. A system according to any one of claims 1, 6, and 11, wherein said data exchange unit comprises user interface data management means for managing user interface data representing an operation method unique to each terminal, and said conversion means obtains user interface data corresponding to said terminal as the communication partner from said user interface data management means and converts the service data provided as the application service into a specific format on the basis of the user interface data.

20. A system according to any one of claims 1, 6, and 11, wherein said data exchange unit comprises user data management means for managing user data representing an operation method unique to each user, and said conversion means obtains user data corresponding to said terminal as the communication partner from said user data management means and converts the service data provided as the application service into a specific format on the basis of the user data.

21. A data exchange apparatus arranged in a data processing apparatus for providing an application service to a terminal connected through a communication network, comprising:

terminal attribute data management means for managing terminal attribute data representing a processing capability of said terminal;

conversion means for acquiring the terminal attribute data of said terminal as a communication partner from said terminal attribute data management means and converting service data provided as the application service into a specific format on the basis of the terminal attribute data, and communication means for transmitting through said communication network the service data converted by said conversion means.

22. A data exchange apparatus arranged in a data processing apparatus for providing an application service to a terminal connected through a communication network, comprising:

communication infrastructure data management means for managing communication infrastructure data representing a communication capability of said communication network;

conversion means for acquiring the communication infrastructure data of said communication network connected to said terminal as a communication partner from said communication infrastructure data management means and converting service data provided as the application service into a specific format on the basis of the communication infrastructure data; and communication means for transmitting through said communication network the service data converted by said conversion means.

23. A data exchange apparatus arranged in a data processing apparatus for providing an application service to a terminal connected through a communication network, comprising:

terminal attribute data management means for managing terminal attribute data representing a processing capability of said terminal;

communication infrastructure data management means for managing communication infrastructure data representing a communication capability of said communication network;

conversion means for acquiring the terminal attribute data of said terminal as a communication partner from said terminal attribute data management means and simultaneously acquiring the communication infrastructure data of said communication network connected to said terminal from said communication infrastructure data management means, and converting service data provided as the application service into a specific format on the basis of the terminal attribute data and the communication infrastructure data; and communication means for transmitting through said communication network the service data converted by said conversion means.

24. A data exchange method in a data processing apparatus for providing an application service to a terminal connected through a communication network, comprising the steps of:

registering terminal attribute data representing a processing capability of said terminal in a terminal attribute data management section;

acquiring the terminal attribute data of said terminal as a communication partner from said terminal attribute data management section;

converting service data provided as the application service into a specific format on the basis of the terminal attribute data; and transmitting the converted service data through said communication network.

25. A data exchange method in a data processing apparatus for providing an application service to a terminal connected through a communication network, comprising the steps of:

registering communication infrastructure data representing a communication capability of said communication network in a communication infrastructure data management section;

acquiring the communication infrastructure data of said communication network connected to said terminal as a communication partner from said communication infrastructure data management section;

converting service data provided as the application service into a specific format on the basis of the communication infrastructure data; and transmitting the converted service data through said communication network.

26. A data exchange method in a data processing apparatus for providing an application service to a terminal connected through a communication network, comprising the steps of:

registering terminal attribute data representing a processing capability of said terminal in a terminal attribute data management section;

registering communication infrastructure data representing a communication capability of said communication network in a communication infrastructure data management section;

acquiring the terminal attribute data of said terminal as a communication partner from said terminal attribute data management section and simultaneously acquiring the communication infrastructure data of said communication network connected to said terminal from said communication infrastructure data management section;

converting service data provided as the application service into a specific format on the basis of the terminal attribute data and the communication infrastructure data; and transmitting the converted service data through said communication network.

27. A data exchange method comprising the steps of:

checking a processing capability of a terminal;

performing data exchange corresponding to a communication capability of a communication network when the processing capability of said terminal includes a data exchange ability corresponding to the communication capability of the communication network; and performing data exchange corresponding to the processing capability of said terminal when the processing capability of said terminal does not include the data exchange ability.

28. A computer readable recording medium on which a program is recorded, comprising:

a procedure code of causing a computer to check a processing capability of a terminal;

a procedure code of causing said computer to perform data exchange corresponding to a communication capability of a communication network when the processing capability of said terminal includes a data exchange ability corresponding to the communication capability of the communication network; and a procedure code of causing said computer to perform data exchange corresponding to the processing capability of said terminal when the processing capability of said terminal does not include the data exchange ability.

29. A distributed network computing system including a first data processing unit for providing an application service of various application software, a terminal for receiving the application service from said first data processing unit, and a communication network which connects said first data processing unit and said terminal, comprising a second data processing unit connected to said communication network independently of said first data processing unit and having terminal attribute data management means for managing terminal attribute data representing a processing capability of said terminal, wherein said first data processing unit comprises:

retrieval means for retrieving said second data processing unit having said terminal attribute data management means;

conversion means for acquiring the terminal attribute data of said terminal as a communication partner from said terminal attribute data management means and converting service data provided as the application service into a specific format on the basis of the terminal attribute data in said second data processing unit retrieved by said retrieval means; and communication means for transmitting through said communication network the service data converted by said conversion means.

30. A system according to claim 29, wherein said second data processing unit comprises enciphering determination means for determining on the basis of the terminal attribute data whether data enciphering is enabled, and enciphering means for enciphering the service data provided as the application service when said enciphering determination means determines that data enciphering is enabled.

31. A system according to claim 30, wherein said enciphering means changes an enciphering level in correspondence with the processing capability of said terminal.

32. A system according to claim 29, wherein said second data processing unit comprises compression determination means for determining on the basis of the terminal attribute data whether data compression is enabled, and compression means for compressing the service data provided as the application service when said compression determination means determines that data compression is enabled.

33. A system according to claim 32, wherein said compression means changes a compression level in correspondence with the processing capability of said terminal.

34. A distributed network computing system including a first data processing unit for providing an application service of various application software, a terminal for receiving the application service from said first data processing unit, and a communication network which connects said first data processing unit and said terminal, comprising:

a second data processing unit connected to said communication network independently of said first data processing unit and having communication infrastructure data management means for managing communication infrastructure data representing a communication capability of said communication network, wherein said first data processing unit comprises:

retrieval means for retrieving said second data processing unit having said communication infrastructure data management means;

conversion means for acquiring the communication infrastructure data corresponding to said terminal as a communication partner from said communication infrastructure data management means and converting service data provided as the application service into a specific format on the basis of the communication infrastructure data in said second data processing unit retrieved by said retrieval means; and communication means for transmitting through said communication network the service data converted by said conversion means.

35. A system according to claim 34, wherein said second data processing unit comprises enciphering determination means for determining on the basis of the communication infrastructure data whether data enciphering is enabled, and enciphering means for enciphering the service data provided as the application service when said enciphering determination means determines that data enciphering is enabled.

36. A system according to claim 35, wherein said enciphering means changes an enciphering level in correspondence with the communication capability of said communication network.

37. A system according to claim 34, wherein said second data processing unit comprises compression determination means for determining on the basis of the communication infrastructure data whether data compression is enabled, and compression means for compressing the service data provided as the application service when said compression determination means determines that data compression is enabled.

38. A system according to claim 37, wherein said compression means changes a compression level in correspondence with the communication capability of said communication network.

39. A distributed network computing system including a first data processing unit for providing an application service of various application software, a terminal for receiving the application service from said first data processing unit, and a communication network which connects said first data processing unit and said terminal, comprising:

a second data processing unit connected to said communication network independently of said first data processing unit and having terminal attribute data management means for managing terminal attribute data representing a processing capability of said terminal and communication infrastructure data management means for managing communication infrastructure data representing a communication capability of said communication network, wherein said first data processing unit comprises:

retrieval means for retrieving said second data processing unit having said terminal attribute data management means and said communication infrastructure data management means;

conversion means for acquiring the terminal attribute data of said terminal as a communication partner from said terminal attribute data management means and simultaneously acquiring the communication infrastructure data corresponding to said terminal as the communication partner from said communication infrastructure data management means, and converting service data provided as the application service into a specific format on the basis of the terminal attribute data and the communication infrastructure data in said second data processing unit retrieved by said retrieval means; and communication means for transmitting through said communication network the service data converted by said conversion means.

40. A system according to claim 39, wherein said second data processing unit comprises enciphering determination means for determining on the basis of the terminal attribute data and the communication infrastructure data whether data enciphering is enabled, and enciphering means for enciphering the service data provided as the application service when said enciphering determination means determines that data enciphering is enabled.

41. A system according to claim 40, wherein said enciphering means changes an enciphering level in correspondence with the processing capability of said terminal and the communication capability of said communication network.

42. A system according to claim 39, wherein said second data processing unit comprises compression determination means for determining on the basis of the terminal attribute data and the communication infrastructure data whether data compression is enabled, and compression means for compressing the service data provided as the application service when said compression determination means determines that data compression is enabled.

43. A system according to claim 42, wherein said compression means changes a compression level in correspondence with the processing capability of said terminal and the communication capability of said communication network.

44. A system according to any one of claims 29, 34, and 39, wherein said terminal comprises a plurality of terminals present on a network.

45. A system according to any one of claims 29, 34, and 39, wherein said communication network comprises a plurality of communication networks present on a network.

46. A system according to any one of claims 29, 34, and 39, wherein said terminal and said communication network respectively comprise a plurality of terminals and a plurality of communication networks present on a network.

47. A system according to any one of claims 29, 34, and 39, wherein said terminal also functions as a server computer.

48. A system according to any one of claims 29, 34, and 39, wherein said second data processing unit comprises user interface data management means for managing user interface data representing an operation method unique to each terminal, said retrieval means retrieves said second data processing unit having said user interface data management means, and said conversion means obtains user interface data corresponding to said terminal as the communication partner from said user interface data management means and converts the service data provided as the application service into a specific format on the basis of the user interface data in said second data processing unit retrieved by said retrieval means.

49. A system according to any one of claims 29, 34, and 39, wherein said second data processing unit comprises user data management means for managing user data representing an operation method unique to each user, said retrieval means retrieves said second data processing unit having said user data management means, and said conversion means obtains user data corresponding to said terminal as the communication partner from said user data management means and converts the service data provided as the application service into a specific format on the basis of the user data in said second data processing unit retrieved by said retrieval means.

50. A data exchange method in a distributed network computing system including a communication network, a terminal connected to said communication network, a first data processing unit for providing an application service to said terminal, and a second data processing unit connected to said communication network and having a terminal attribute data management section, comprising the computer steps of:

registering terminal attribute data representing a processing capability of said terminal in said terminal attribute data management section;

retrieving said second data processing unit having said terminal attribute data management section;

acquiring the terminal attribute data of said terminal as a communication partner from said terminal attribute data management section in said second data processing unit;

converting service data provided as the application service into a specific format on the basis of the terminal attribute data; and transmitting the converted service data through said communication network.

51. A data exchange method in a distributed network computing system including a communication network, a terminal connected to said communication network, a first data processing unit for providing an application service to said terminal, and a second data processing unit connected to said communication network and having a communication infrastructure data management section, comprising the computer steps of:

registering communication infrastructure data representing a communication capability of said communication network in said communication infrastructure data management section;

retrieving said second data processing unit having said communication infrastructure data management section;

acquiring the communication infrastructure data of said communication network connected to said terminal as a communication partner from said communication infrastructure data management section in said second data processing unit;

converting service data provided as the application service into a specific format on the basis of the communication infrastructure data; and transmitting the converted service data through said communication network.

52. A data exchange method in a distributed network computing system including a communication network, a terminal connected to said communication network, a first data processing unit for providing an application service to said terminal, and a second data processing unit connected to said communication network and having a terminal attribute data management section and a communication infrastructure data management section, comprising the computer steps of:

registering terminal attribute data representing a processing capability of said terminal in said terminal attribute data management section and registering communication infrastructure data representing a communication capability of said communication network in said communication infrastructure data management section;

retrieving said second data processing unit having said terminal attribute data management section and said communication infrastructure data management section;

acquiring the terminal attribute data of said terminal as a communication partner from said terminal attribute data management section and simultaneously acquiring the communication infrastructure data of said communication network connected to said terminal in said second data processing unit;

converting service data provided as the application service into a specific format on the basis of the terminal attribute data and the communication infrastructure data; and transmitting the converted service data through said communication network.

53. A distributed network computing system including a data processing unit for providing an application service of various application software, a terminal for receiving the application service from said data processing unit, and a communication network which connects said data processing unit and said terminal, comprising:

network connection means for connecting networks to each other; and a data exchange unit arranged in said network connection means, said data exchange unit comprising:

terminal attribute data management means for managing terminal attribute data representing a processing capability of said terminal;

conversion means for acquiring the terminal attribute data of said terminal as a communication partner from said terminal attribute data management means and converting service data provided as the application service into a specific format on the basis of the terminal attribute data; and communication means for transmitting through said communication network the service data converted by said conversion means.

54. A system according to claim 53, wherein said data exchange unit comprises enciphering determination means for determining on the basis of the terminal attribute data whether data enciphering is enabled, and enciphering means for enciphering the service data provided as the application service when said enciphering determination means determines that data enciphering is enabled.

55. A system according to claim 54, wherein said enciphering means changes an enciphering level in correspondence with the processing capability of said terminal.

56. A system according to claim 53, wherein said data exchange unit comprises compression determination means for determining on the basis of the terminal attribute data whether data compression is enabled, and compression means for compressing the service data provided as the application service when said compression determination means determines that data compression is enabled.

57. A system according to claim 56, wherein said compression means changes a compression level in correspondence with the processing capability of said terminal.

58. A distributed network computing system including a data processing unit for providing an application service of various application software, a terminal for receiving the application service from said data processing unit, and a communication network which connects said data processing unit and said terminal, comprising:

network connection means for connecting networks to each other; and a data exchange unit arranged in said network connection means, said data exchange unit comprising:

communication infrastructure data management means for managing communication infrastructure data representing a communication capability of said communication network;

conversion means for acquiring the communication infrastructure data of said communication network connected to said terminal as a communication partner from said communication infrastructure data management means and converting service data provided as the application service into a specific format on the basis of the communication infrastructure data; and communication means for transmitting through said communication network the service data converted by said conversion means.

59. A system according to claim 58, wherein said data exchange unit comprises enciphering determination means for determining on the basis of the communication infrastructure data whether data enciphering is enabled, and enciphering means for enciphering the service data provided as the application service when said enciphering determination means determines that data enciphering is enabled.

60. A system according to claim 59, wherein said enciphering means changes an enciphering level in correspondence with the communication capability of said communication network.

61. A system according to claim 58, wherein said data exchange unit comprises
    compression determination means for determining on the basis of the communication infrastructure data whether data compression is enabled, and
    compression means for compressing the service data provided as the application service when said compression determination means determines that data compression is enabled.

62. A system according to claim 61, wherein said compression means changes a compression level in correspondence with the communication capability of said communication network.

63. A distributed network computing system including
    a data processing unit for providing an application service of various application software,
    a terminal for receiving the application service from said data processing unit, and
    a communication network which connects said data processing unit and said terminal, comprising:
        network connection means for connecting networks to each other; and
        a data exchange unit arranged in said network connection means,
        said data exchange unit comprising:
            terminal attribute data management means for managing terminal attribute data representing a processing capability of said terminal;
            communication infrastructure data management means for managing communication infrastructure data representing a communication capability of said communication network;
            conversion means for acquiring the terminal attribute data of said terminal as a communication partner from said terminal attribute data management means and simultaneously acquiring the communication infrastructure data of said communication network connected to said terminal from said communication infrastructure data management means, and converting service data provided as the application service into a specific format on the basis of the terminal attribute data and the communication infrastructure data; and
            communication means for transmitting through said communication network the service data converted by said conversion means.

64. A system according to claim 63, wherein said data exchange unit comprises
    enciphering determination means for determining on the basis of the terminal attribute data and the communication infrastructure data whether data enciphering is enabled, and
    enciphering means for enciphering the service data provided as the application service when said enciphering determination means determines that data enciphering is enabled.

65. A system according to claim 64, wherein said enciphering means changes an enciphering level in correspondence with the processing capability of said terminal and the communication capability of said communication network.

66. A system according to claim 63, wherein said data exchange unit comprises
    compression determination means for determining on the basis of the terminal attribute data and the communication infrastructure data whether data compression is enabled, and
    compression means for compressing the service data provided as the application service when said compression determination means determines that data compression is enabled.

67. A system according to claim 66, wherein said compression means changes a compression level in correspondence with the processing capability of said terminal and the communication capability of said communication network.

68. A system according to any one of claims 53, 58, and 63, wherein said terminal comprises a plurality of terminals present on said network.

69. A system according to any one of claims 53, 58, and 63, wherein said communication network comprises a plurality of communication networks are present on said network.

70. A system according to any one of claims 53, 58, and 63, wherein said terminal and said communication network respectively comprise a plurality of terminals and a plurality of communication networks are present on said network.

71. A system according to any one of claims 53, 58, and 63, wherein said terminal also operates as a server computer.

72. A system according to any one of claims 53, 58, and 63, wherein said network connection means comprises a plurality of network connection means present on said network, and functions of said data exchange unit are distributed to said plurality of network connection means.

73. A system according to any one of claims 53, 58, and 63, wherein said network connection means is integrally arranged in said data processing unit to constitute an integrated server together with said data processing unit.

74. A system according to any one of claims 53, 58, and 63, wherein said data exchange unit is arranged on said network independently of said data processing unit and said network connection means.

75. A system according to any one of claims 53, 58, and 63, wherein said data exchange unit comprises user interface data management means for managing user interface data representing an operation method unique to each terminal, and
    said conversion means obtains user interface data corresponding to said terminal as the communication partner from said user interface data management means and converts the service data provided as the application service into a specific format on the basis of the user interface data.

76. A system according to any one of claims 53, 58, and 63, wherein said data exchange unit comprises user data management means for managing user data representing an operation method unique to each user, and
    said conversion means obtains user data corresponding to said terminal as the communication partner from said user data management means and converts the service data provided as the application service into a specific format on the basis of the user data.

77. A data exchange method comprising the steps of:
    arranging a data exchange function in a network connection unit for connecting networks to each other;
    when service data provided as an application service from a data processing unit to a terminal,
    determining a processing capability of said terminal on a side of said network connection unit; and
    converting the service data into a specific format in correspondence with the processing capability of said terminal.

78. A data exchange method comprising the steps of:
    arranging a data exchange function in a network connection unit for connecting networks to each other;

when service data provided as an application service from a data processing unit to a terminal, determining a communication capability of a communication network connected to said terminal on a side of said network connection unit; and converting the service data into a specific format in correspondence with the communication capability of said communication network.

79. A data exchange method comprising the steps of:

arranging a data exchange function in a network connection unit for connecting networks to each other;

when service data provided as an application service from a data processing unit to a terminal, determining a processing capability of said terminal and a communication capability of a communication network connected to said terminal on a side of said network connection unit; and converting the service data into a specific format in correspondence with the processing capability of said terminal and the communication capability of said communication network.

80. A distributed network computing system including a data processing unit for providing an application service of various application software, a terminal for receiving the application service from said data processing unit, and a communication network which connects said data processing unit and said terminal, comprising:

a data exchange unit arranged in said data processing unit, said data exchange unit comprising:

analysis means for analyzing service data described in a structured document format as a component data format;

terminal attribute data management means for managing terminal attribute data representing a processing capability of said terminal;

conversion means for acquiring the terminal attribute data of said terminal as a communication partner from said terminal attribute data management means and converting the service data analyzed by said analysis means into a specific format on the basis of the terminal attribute data; and communication means for transmitting through said communication network the service data converted by said conversion means.

81. A system according to claim 80, wherein said data exchange unit comprises enciphering determination means for determining on the basis of the terminal attribute data whether data enciphering is enabled, and enciphering means for enciphering the service data provided as the application service when said enciphering determination means determines that data enciphering is enabled.

82. A system according to claim 81, wherein said enciphering means changes an enciphering level in correspondence with the processing capability of said terminal.

83. A system according to claim 80, wherein said data exchange unit comprises compression determination means for determining on the basis of the terminal attribute data whether data compression is enabled, and compression means for compressing the service data provided as the application service when said compression determination means determines that data compression is enabled.

84. A system according to claim 83, wherein said compression means changes a compression level in correspondence with the processing capability of said terminal.

85. A distributed network computing system including a data processing unit for providing an application service of various application software, a terminal for receiving the application service from said data processing unit, and a communication network which connects said data processing unit and said terminal, comprising:

a data exchange unit arranged in said data processing unit, said data exchange unit comprising:

analysis means for analyzing service data described in a structured document format as a component data format;

communication infrastructure data management means for managing communication infrastructure data representing a communication capability of said communication network;

conversion means for acquiring the communication infrastructure data of a communication network connected to said terminal as a communication partner from said communication infrastructure data management means and converting the service data analyzed by said analysis means into a specific format on the basis of the communication infrastructure data; and communication means for transmitting through said communication network the service data converted by said conversion means.

86. A system according to claim 85, wherein said data exchange unit comprises enciphering determination means for determining on the basis of the communication infrastructure data whether data enciphering is enabled, and enciphering means for enciphering the service data provided as the application service when said enciphering determination means determines that data enciphering is enabled.

87. A system according to claim 86, wherein said enciphering means changes an enciphering level in correspondence with the communication capability of said communication network.

88. A system according to claim 85, wherein said data exchange unit comprises compression determination means for determining on the basis of the communication infrastructure data whether data compression is enabled, and compression means for compressing the service data provided as the application service when said compression determination means determines that data compression is enabled.

89. A system according to claim 88, wherein said compression means changes a compression level in correspondence with the communication capability of said communication network.

90. A distributed network computing system including a data processing unit for providing an application service of various application software, a terminal for receiving the application service from said data processing unit, and a communication network which connects said data processing unit and said terminal, comprising:

a data exchange unit arranged in said data processing unit, said data exchange unit comprising:

analysis means for analyzing service data described in a structured document format as a component data format;

terminal attribute data management means for managing terminal attribute data representing a processing capability of said terminal;

communication infrastructure data management means for managing communication infrastructure data representing a communication capability of said communication network;

conversion means for acquiring the terminal attribute data of said terminal as a communication partner from said terminal attribute data management means and simultaneously acquiring the commuinication infrastructure data of a communication network connected to said terminal partner from said communicaiton infrastructure data management means, and converting the service data analyzed by said analysis means into a specific format; and communication means for transmitting through said communication network the service data converted by said conversion means.

91. A system according to claim 90, wherein said data exchange unit comprises enciphering determination means for determining on the basis of the terminal attribute data and the communication infrastructure data whether data enciphering is enabled, and enciphering means for enciphering the service data provided as the application service when said enciphering determination means determines that data enciphering is enabled.

92. A system according to claim 91, wherein said enciphering means changes an enciphering level in correspondence with the processing capability of said terminal and the communication capability of said communication network.

93. A system according to claim 90, wherein said data exchange unit comprises compression determination means for determining on the basis of the terminal attribute data and the communication infrastructure data whether data compression is enabled, and compression means for compressing the service data provided as the application service when said compression determination means determines that data compression is enabled.

94. A system according to claim 93, wherein said compression means changes a compression level in correspondence with the processing capability of said terminal and the communication capability of said communication network.

95. A system according to any one of claims 80, 85, and 90, wherein said terminal comprises a plurality of terminals are present on a network.

96. A system according to any one of claims 80, 85, and 90, wherein said communication network comprises a plurality of communication networks are present on a network.

97. A system according to any one of claims 80, 85, and 90, wherein said terminal and said communication network respectively comprise a plurality of terminals and a plurality of communication networks are present on a network.

98. A system according to any one of claims 80, 85, and 90, wherein said data exchange unit comprises component data conversion means for converting the service data described in a noncomponent data format into the component data format, and said analysis means analyzes the service data described in the component data format by said component data conversion means.

99. A system according to any one of claims 80, 85, and 90, wherein said data exchange unit comprises user interface data management means for managing user interface data representing an operation method unique to each terminal, and said conversion means obtains user interface data corresponding to said terminal as the communication partner from said user interface data management means and converts the service data provided as the application service into a specific format on the basis of the user interface data.

100. A system according to any one of claims 80, 85, and 90, wherein said data exchange unit comprises user data management means for managing user data representing an operation method unique to each user, and said conversion means obtains user data corresponding to said terminal as the communication partner from said user data management means and converts the service data provided as the application service into a specific format on the basis of the user data.

101. A data exchange apparatus arranged in a data processing apparatus for providing an application service to a terminal connected through a communication network, comprising:

analysis means for analyzing service data described in a structured document format as a component data format;

terminal attribute data management means for managing terminal attribute data representing a processing capability of said terminal;

conversion means for acquiring the terminal attribute data of said terminal as a communication partner from said terminal attribute data management means and converting the service data, analyzed by said analysis means, into a specific format on the basis of the terminal attribute data, and communication means for transmitting through said communication network the service data converted by said conversion means.

102. A data exchange apparatus arranged in a data processing apparatus for providing an application service to a terminal connected through a communication network, comprising:

analysis means for analyzing service data described in a structured document format as a component data format;

communication infrastructure data management means for managing communication infrastructure data representing a communication capability of said communication network;

conversion means for acquiring the communication infrastructure data of said communication network connected to said terminal as a communication partner from said communication infrastructure data management means and converting the service data, analyzed by said analysis means, into a specific format on the basis of the communication infrastructure data; and communication means for transmitting through said communication network the service data converted by said conversion means.

103. A data exchange apparatus arranged in a data processing apparatus for providing an application service to a terminal connected through a communication network, comprising:

analysis means for analyzing service data described in a structured document format as a component data format;

terminal attribute data management means for managing terminal attribute data representing a processing capability of said terminal;

communication infrastructure data management means for managing communication infrastructure data representing a communication capability of said communication network;

conversion means for acquiring the terminal attribute data of said terminal as a communication partner from said terminal attribute data management means and simultaneously acquiring the communication infrastructure data of said communication network connected to said terminal from said communication infrastructure data management means, and converting the service data, analyzed by said analysis means, into a specific format on the basis of the terminal attribute data and the communication infrastructure data; and communication means for transmitting through said communication network the service data converted by said conversion means.

104. An apparatus according to any one of claims 101, 102, and 103, wherein said data exchange unit comprises component data conversion means for converting the service data described in a noncomponent data format into the component data format, and said analysis means analyzes the service data described in the component data format by said component data conversion means.

105. A data exchange method in a data processing apparatus for providing an application service to a terminal connected through a communication network, comprising the steps of:

registering terminal attribute data representing a processing capability of said terminal in a terminal attribute data management section;

analyzing service data described in a structured document format as a component data format;

acquiring the terminal attribute data of said terminal as a communication partner from said terminal attribute data management section;

converting the analyzed service data into a specific format on the basis of the terminal attribute data; and transmitting the converted service data through said communication network.

106. A data exchange method in a data processing apparatus for providing an application service to a terminal connected through a communication network, comprising the steps of:

registering communication infrastructure data representing a communication capability of said communication network in a communication infrastructure data management section;

analyzing service data described in a structured document format as a component data format;

acquiring the communication infrastructure data of said communication network connected to said terminal as a communication partner from said communication infrastructure data management section;

converting the analyzed service data into a specific format on the basis of the communication infrastructure data; and transmitting the converted service data through said communication network.

107. A data exchange method in a data processing apparatus for providing an application service to a terminal connected through a communication network, comprising the steps of:

registering terminal attribute data representing a processing capability of said terminal in a terminal attribute data management section;

registering communication infrastructure data representing a communication capability of said communication network in a communication infrastructure data management section;

analyzing service data described in a structured document format as a component data format;

acquiring the terminal attribute data of said terminal as a communication partner from said terminal attribute data management section and simultaneously acquiring the communication infrastructure data of said communication network connected to said terminal from said communication infrastructure data management section;

converting the analyzed service data into a specific format on the basis of the terminal attribute data and the communication infrastructure data; and transmitting the converted service data through said communication network.

108. A method according to any one of claims 105, 106, and 107, further comprising converting service data described in a noncomponent data format into the component data format, analyzing the service data described in the component data format, and performing data exchange.

109. A data exchange method comprising the steps of:

analyzing service data described in a structured document format as a component document format;

checking a processing capability of a terminal;

when the processing capability of said terminal includes a data exchange ability corresponding to a communication capability of a communication network, converting the analyzed service data into a predetermined format in correspondence with the communication capability of the communication network; and when the processing capability of said terminal does not include the data exchange ability, converting the analyzed service data into a predetermined format in correspondence with the processing capability of said terminal.

110. A data exchange method comprising the steps of:

converting service data described in a non-component data format into a component data format;

analyzing the service data described in the component data format;

checking a processing capability of a terminal;

when the processing capability of said terminal includes a data exchange ability corresponding to a communication capability of a communication network, converting the analyzed service data into a predetermined format in correspondence with the communication capability of the communication network; and when the processing capability of said terminal does not include the data exchange ability, converting the analyzed service data into a predetermined format in correspondence with the processing capability of said terminal.

111. A computer readable recording medium on which a program is recorded, comprising:

a procedure code of causing a computer to analyze service data described in a structured document format as a component document format a procedure code of causing said computer to check a processing capability of a terminal;

a procedure code of, when the processing capability of said terminal includes a data exchange ability corresponding to a communication capability of a communication network, causing said computer to convert the analyzed service data into a predetermined format in correspondence with the communication capability of the communication network; and a procedure code of, when the processing capability of said terminal does not include the data exchange ability, causing said computer to convert the analyzed service data into a predetermined format in correspondence with the processing capability of said terminal.

112. A computer readable recording medium on which a program is recorded, comprising:

a procedure code of causing a computer to convert service data described in a noncomponent data format into a component data format;

a procedure code of causing said computer to analyze the service data described in the component data format;

a procedure code of causing said computer to check a processing capability of a terminal;

a procedure code of, when the processing capability of said terminal includes a data exchange ability corresponding to a communication capability of a communication network, causing said computer to convert the analyzed service data into a predetermined format in correspondence with the communication capability of the communication network; and a procedure code of, when the processing capability of said terminal does not include the data exchange ability, causing said computer to convert the analyzed service data into a predetermined format in correspondence with the processing capability of said terminal.

* * * * *